(12) United States Patent
Bech

(10) Patent No.: US 11,022,093 B2
(45) Date of Patent: Jun. 1, 2021

(54) JOINT FOR CONNECTING A WIND TURBINE ROTOR BLADE TO A ROTOR HUB AND ASSOCIATED METHODS

(71) Applicant: Vestas Wind Systems A/S, Aarhus N. (DK)

(72) Inventor: Anton Bech, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 94 days.

(21) Appl. No.: 16/473,757

(22) PCT Filed: Dec. 13, 2017

(86) PCT No.: PCT/DK2017/050429
§ 371 (c)(1),
(2) Date: Jun. 26, 2019

(87) PCT Pub. No.: WO2018/121824
PCT Pub. Date: Jul. 5, 2018

(65) Prior Publication Data
US 2019/0331091 A1    Oct. 31, 2019

(30) Foreign Application Priority Data
Dec. 28, 2016    (DK) .......................... PA 2016 71056

(51) Int. Cl.
*F03D 1/06*    (2006.01)
(52) U.S. Cl.
CPC ......... *F03D 1/0658* (2013.01); *F03D 1/0675* (2013.01); *F05B 2260/30* (2013.01); *F05B 2280/6003* (2013.01)
(58) Field of Classification Search
CPC .... F03D 1/0658; F03D 1/0675; F03D 1/0691; F03D 1/0633; F03D 1/065; F03D 1/0683;
(Continued)

(56) References Cited

U.S. PATENT DOCUMENTS 7,481,624 B2    1/2009 Wobben
8,388,316 B2 *  3/2013 Arocena De La Rua ...................
................................................. F03D 1/0658
416/224

(Continued)

FOREIGN PATENT DOCUMENTS

CN    1957178 A    5/2007
CN    202076750 U    12/2011
(Continued)

OTHER PUBLICATIONS

European Patent Office, Examination Report in EP Application No. 17816428.1, dated Apr. 3, 2020.
(Continued)

*Primary Examiner* — J. Todd Newton
*Assistant Examiner* — Eric J Zamora Alvarez
(74) *Attorney, Agent, or Firm* — Wood Herron & Evans LLP

(57) ABSTRACT

A wind turbine rotor blade includes an elongate body having a root end configured to be coupled to a rotor hub of a wind turbine. The rotor blade further includes a connection joint at the root end for connecting the rotor blade to the rotor hub. The connection joint includes a plurality of connecting elements integrated into the root end of the rotor blade and including an eye that defines a bore through the root end of the rotor blade. The connecting elements may be formed from folded fiber rovings wherein the fold forms the eye. A method of making a rotor blade having the connecting element integrated therein, and a method of making the connecting elements are also disclosed.

28 Claims, 20 Drawing Sheets

(58) Field of Classification Search
CPC ...... F05B 2280/6013; F05B 2280/6003; F05B 2280/702; F05B 2240/30; F05B 2240/302; F01D 5/30; Y10T 29/49336; Y10T 29/49337; F05C 2253/04; F05C 2253/16

See application file for complete search history.

(56) References Cited

U.S. PATENT DOCUMENTS

| | | | |
|---|---|---|---|
| 2008/0232966 | A1 | 9/2008 | Wang et al. |
| 2012/0070295 | A1 | 3/2012 | Klein |
| 2014/0356176 | A1* | 12/2014 | Caruso ............... F03D 1/0658 416/219 R |

FOREIGN PATENT DOCUMENTS

| | | |
|---|---|---|
| CN | 103496173 A | 1/2014 |
| CN | 105102829 A | 11/2015 |
| CN | 205692632 U | 11/2016 |
| DE | 102008045939 A1 | 3/2010 |
| DE | 102011088025 A1 | 6/2013 |
| EP | 0474090 A1 | 3/1992 |
| EP | 2138716 A1 | 12/2009 |
| EP | 2944803 A1 | 11/2015 |
| GB | 2494389 A | 3/2013 |
| WO | 0142647 A2 | 6/2001 |
| WO | 2014155293 A1 | 10/2014 |
| WO | 2015155079 A1 | 10/2015 |

OTHER PUBLICATIONS

Danish Patent and Trademark Office, Search and Examination Report in PA 2016 71056, dated Jun. 21, 2017.
European Patent Office, International Search Report and Written Opinion in PCT Application No. PCT/DK2017/050429, dated Mar. 12, 2018.
China National Intellectual Property Administration, First Notificaiton of Office Action, in CN Application No. 201780085493.5, dated Jun. 28, 2020.

* cited by examiner

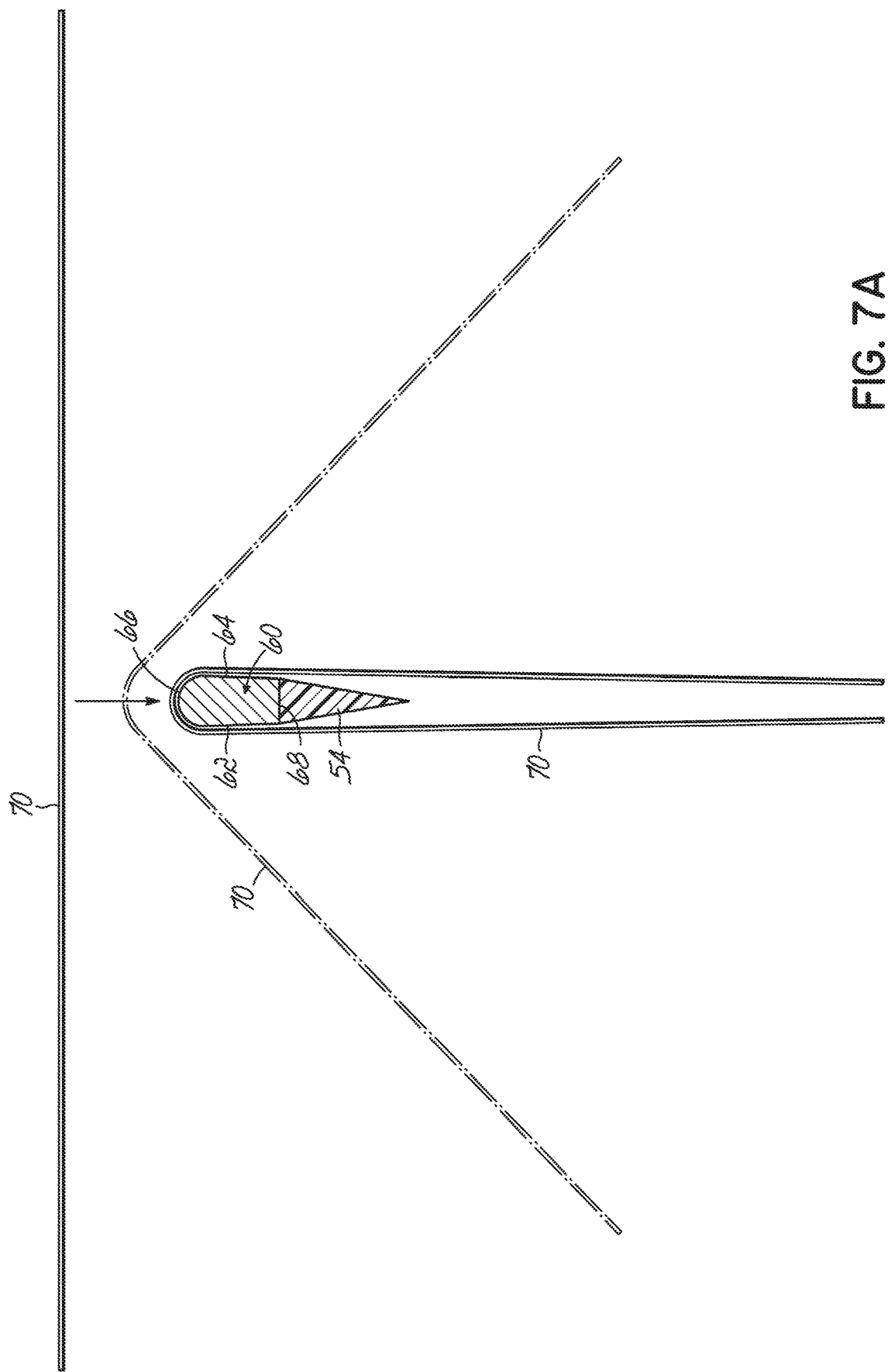

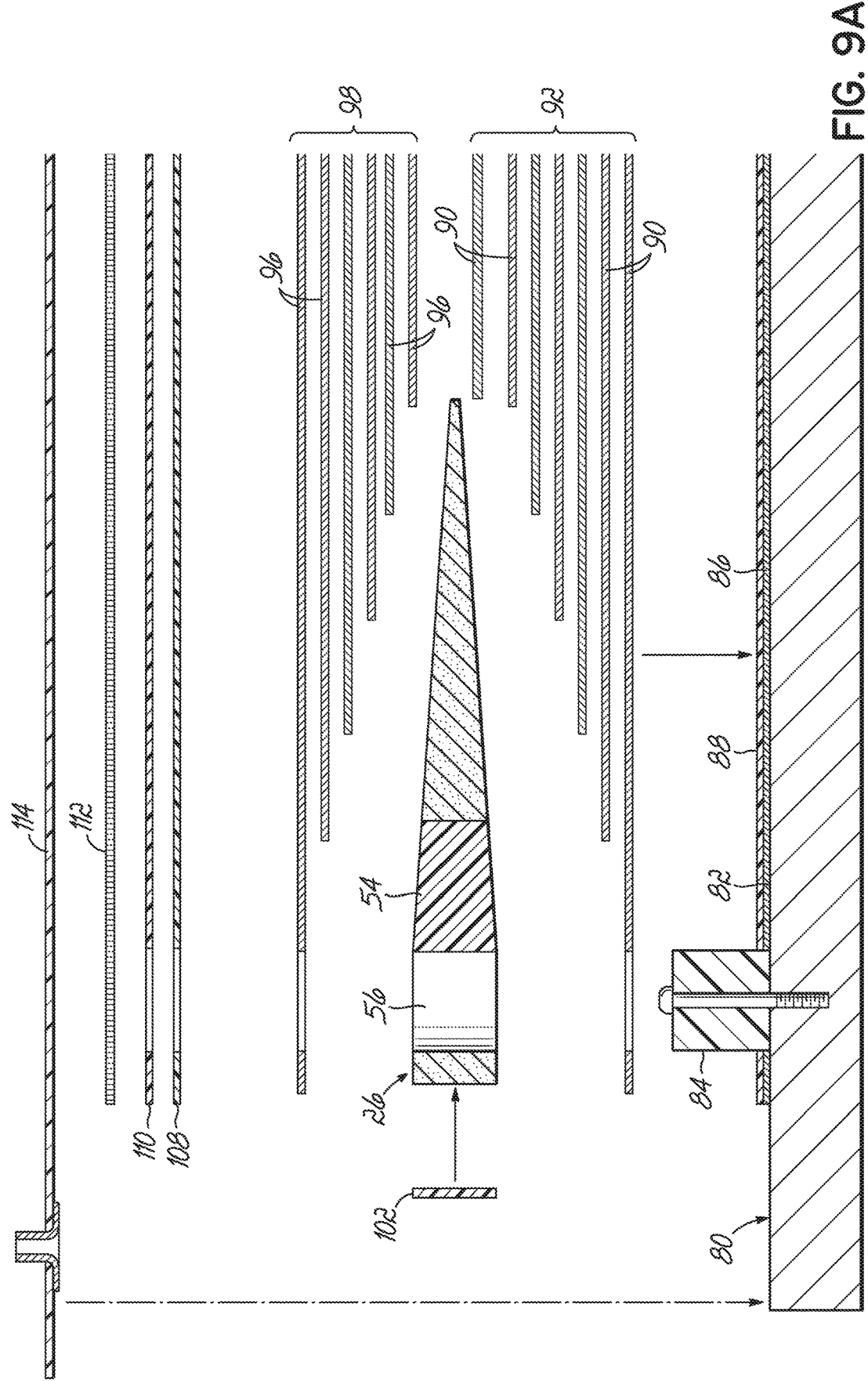

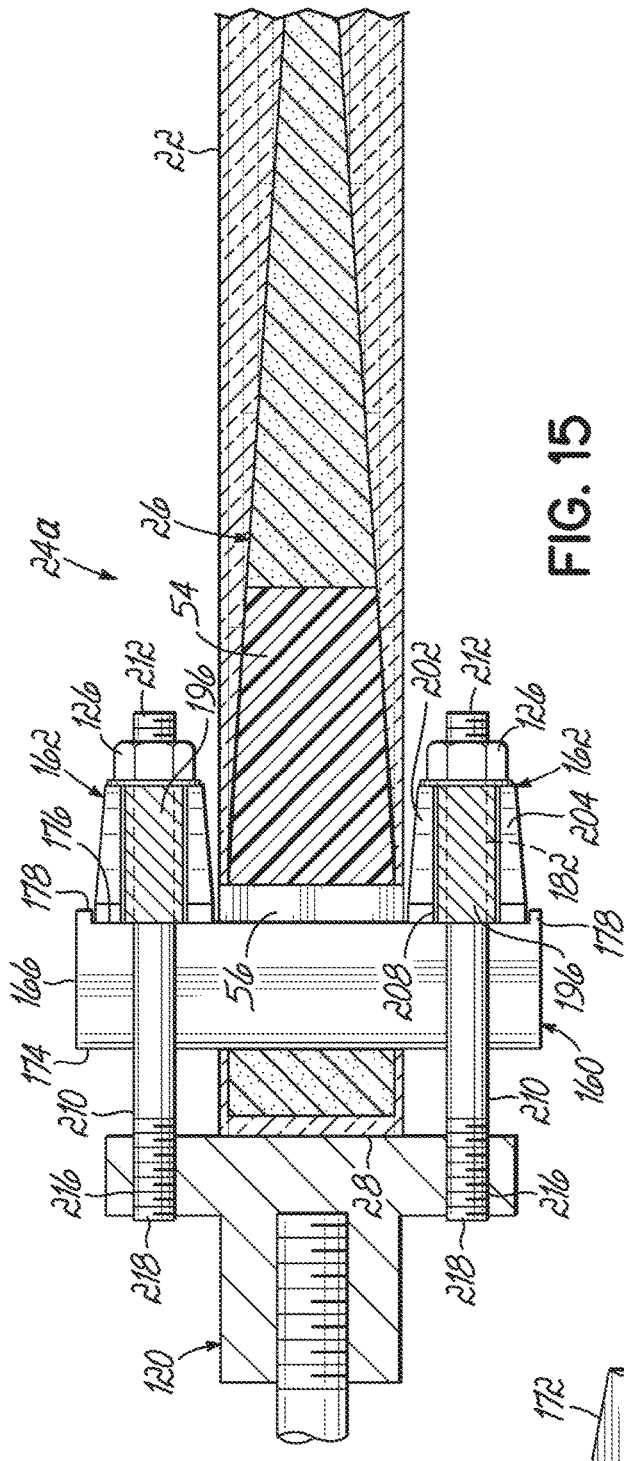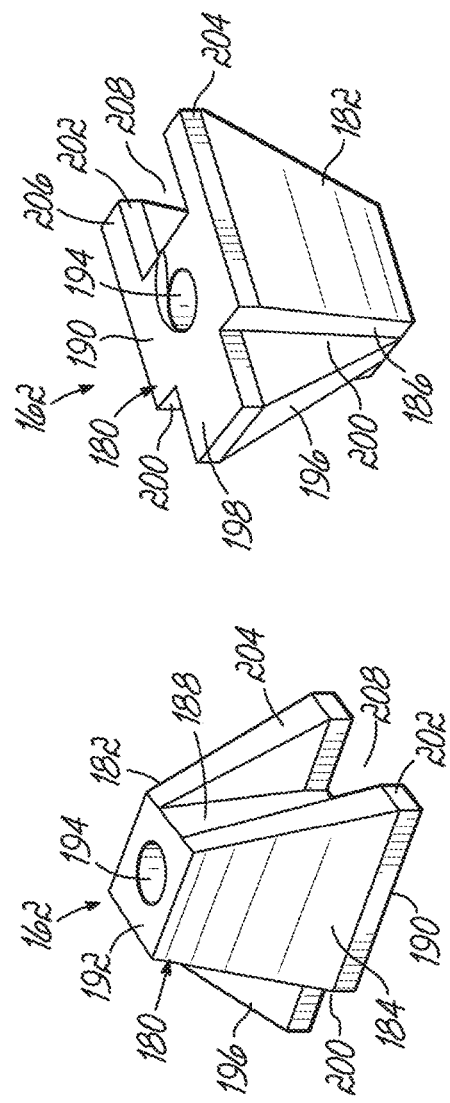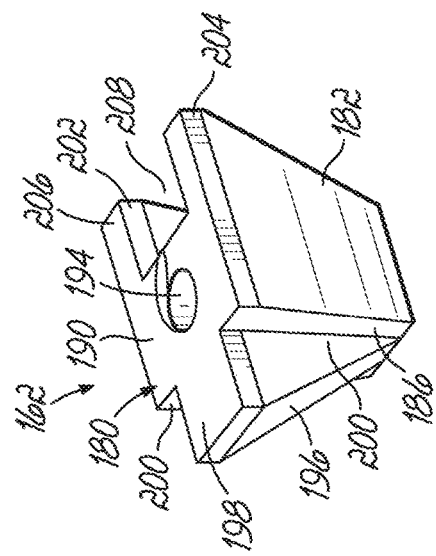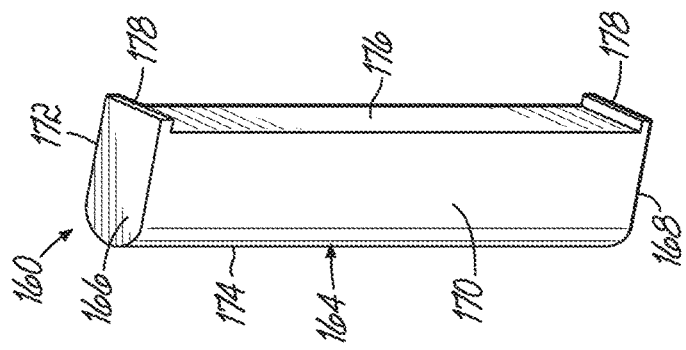

JOINT FOR CONNECTING A WIND TURBINE ROTOR BLADE TO A ROTOR HUB AND ASSOCIATED METHODS

TECHNICAL FIELD

The invention relates generally to wind turbines, and more particularly to an improved joint for connecting a wind turbine rotor blade to a rotor hub, and a method of forming a wind turbine rotor blade having an improved joint for connecting the rotor blade to the rotor hub.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a central hub and a plurality of blades coupled to the hub and extending outwardly therefrom. The rotor is supported on a shaft extending from the nacelle, which shaft is either directly or indirectly operatively coupled with a generator which is housed inside the nacelle. Consequently, as wind forces the blades to rotate, electrical energy is produced by the generator.

In recent years, wind power has become a more attractive alternative energy source and the number of wind turbine, wind farms, etc. has significantly increased, both on land and off-shore. Additionally, the size of wind turbines has also significantly increased, with modern wind turbine blades extending between 50 to 80 meters in length, and is expected to further increase in the future. The increased length in the wind turbine blades has introduced a number of interesting design considerations for wind turbine designers and manufacturers. For example, with increasing blade length, the joint between the wind turbine blade to the rotor hub may experience increased stresses that present challenging design considerations in order to ensure that the joint can withstand the loads expected during the operating life of the wind turbine.

Conventional joints between wind turbine rotor blades and the rotor hub include threaded stud bolts coupled to and extending from the root end of the wind turbine blade, which are in turn coupled to a pitch bearing associated with the rotor hub. Wind turbine blades are typically made from one or more composite materials formed from layers of fibrous material fabric and resin. Such materials exhibit excellent strength with low weight properties. Nevertheless, their strength can be diminished in the context of root connection fittings because root connections generally require holes to be made in the composite material. The making of holes in a blade root region generally also involves cutting or drilling through the fibrous reinforcing material thereby damaging it locally at the walls of the hole. A hole or bore, for example, may be tapped into the composite material at the root end of the rotor blade, into which a stud bolt insert may achieve a connection. This necessarily reduces some of the material's intrinsic strength. The composite material including planar, fabric type lay-ups of reinforcement material may have insufficient shear strength when perforated and subject to shear forces in the plane of the material lay-ups, to transfer the loads between the blades and hub via the stud bolts. Consequently, deterioration of the composite material at the interface may be expected to occur.

For this reason, manufacturers attempt to design a joint that distributes in a different way, the forces occurring at the connection between the root end of the blade and the rotor hub. For example, it is generally known to utilize a T-joint for connecting the root end of the blade to the rotor hub. In this design, a plurality of axial bores are formed along the circumference in the end face of the blade. Additionally, a plurality of radial bores, such as blind bores or through bores, are formed in the side wall of the root end of blade so as to intersect a corresponding axial bore. A metal insert having a threaded bore is then positioned in each of the radial bores in the side wall of the blade. Stud bolts are then inserted into the axial bores and threadably engaged with the threaded bores of the metal inserts to form the T-joint and thereby retain the stud bolts at the root end of the blade. This alternative type of blade root connection also requires some forming of holes in the composite material and thereby also involves some local weakening of embedded fibrous layers, through which the holes are formed.

In another design, axial bores are formed along the circumference of the end face of the wind turbine blade. Internally threaded metal inserts are then positioned within the axial bores and adhesively bonded therein to essentially embed the metal inserts within the composite material of the rotor blade. Stud bolts are then threadably engaged with the metal inserts. The forces acting between the rotor blade and rotor hub act through the stud bolts, and thus are transferred via the metal inserts, which operate to more uniformly distribute the forces over the interface area with the softer composite material.

While current connection joints are sufficient to achieve their intended purpose of supporting the loads between the rotor blades and rotor hub, one drawback is that as the size of wind turbine blades continues to increase, the strength of the connection joint will also have to increase. One potential solution is to simply increase the size of the root end of the blade and corresponding components on the rotor. This approach, however, requires additional material and manufacturing costs. There may also be some practical size limitations that render this approach undesirable. Another solution may be to simply increase the number of connecting bolts around the circumference of the root end of the blade. In other words, the connecting bolt density (i.e., the number of bolts per length of circumference) may be increased. This approach, however, also has limitations, since a higher density of holes or bores at a blade root region may exacerbate weakening of fibrous reinforcement material in a composite material body. In this regard, the formation of axial bores and radial bores (e.g., for T-joints) removes material from the root end of the blade. As the connecting bolt density increases, the amount of void space in the root end of the blade correspondingly increases. Should too much material be removed, the structural integrity of the blade at the root end may become compromised. Thus, as a practical matter there may be a limit to the number of connecting bolts that can be used for a given circumference of the blade at the root end. The result of this limit is that the connecting interface has to be larger, which suffers from the drawbacks mentioned above.

For the reasons outlined above, manufacturers continually strive to provide a connection joint for attaching the root end of wind turbine blades to a rotor hub that accommodates increased loading of the blades in a cost-effective manner and without sacrificing the structural integrity of the blade in the root region. In other words, it is desirable to have a high strength connection (e.g., high load capability) with a relatively small connection interface size.

SUMMARY

To these and other ends, a wind turbine rotor blade includes an elongate body having a root end and a tip end, wherein the root end of the rotor blade is configured to be coupled to a rotor hub of a wind turbine. The root end includes an end face and a side wall extending away from the end face. The rotor blade further includes a connection joint at the root end for connecting the rotor blade to the rotor hub. The connection joint includes a plurality of connecting elements integrated into the root end of the rotor blade and including an eye that defines a bore through the side wall of the root end of the rotor blade and which is spaced from the end face. The eye may be formed in a radial direction through the blade root side wall.

In an exemplary embodiment, each of the plurality of connecting elements includes a folded roving of fibers, wherein the eye of the connecting elements is defined at least in part by the fold in the fiber rovings. More particularly, the folded roving of fibers defines a radial through hole. In aspects, an insert may be positioned in the through hole such that a portion of the through hole and a portion of the insert forms a boundary of the eye of the connecting elements. In one embodiment, the roving of fibers may be provided by stacked plies of fiber material. The stack of fiber material plies may primarily include unidirectional fibers. The fibers may include glass fibers, carbon fibers or combinations thereof. In one aspect, at least a portion of the eyes of the plurality of connecting elements is formed by longitudinal side walls of the fiber rovings such that there are substantially no fiber endings at a boundary of the eyes along the portion formed by the fiber rovings.

The connecting elements may be entirely made from non-metallic materials. For example, the connecting elements may be made entirely from a composite material. Additionally, the connecting elements may be wedge shaped in at least one direction. More particularly, the connecting elements may be tapered in two directions, such as in a height direction and a width direction. A head end of the connecting elements may be formed by an arcuate arrangement (e.g., semicircular arrangement) of the fiber rovings. In one embodiment, the root end of the rotor blade may be a molded article and the plurality of connecting elements may be integrated into the root end during molding of the root end.

The connection joint may further include a plurality of cross pins configured to be received through respective eyes of the plurality of connecting elements which form the bores in the side wall of the root end. When the cross pins are received in the eyes, an exposed portion of the cross pins is configured to extend from at least one surface of the side wall of the root end of the rotor blade. In one embodiment, when the cross pins are received in the eyes, an exposed portion of the cross pins is configured to extend away from an outer surface and an inner surface of the side wall. The cross pins may include one or more grooves configured to receive a fastener. For example, the cross pins may include one groove in one embodiment and two grooves in another embodiment. In another embodiment, the cross pins include two bosses extending in opposite directions to provide a T-shaped cross pin. Each of the bosses includes a through hole for receiving a fastener. In one embodiment, a plurality of retention heads may be provided and includes a through hole for receiving a fastener. Each retention head is configured to abut two adjacent cross pins and overlap or interlock with adjacent retention heads. In various embodiments, the cross pins are slidably insertable into the respective eyes of the plurality of connecting elements and are not otherwise fixedly secured to the root end of the rotor blade.

The connection joint further includes a plurality of fasteners for securing the root end of the rotor blade to a hub support of the rotor hub. The fasteners are configured to engage with an exposed portion of the cross pins when the cross pins are received through respective eyes of the plurality of connecting elements. The fasteners may include U-bolts, stud bolts, or I-bolts in various embodiments. The connection joint is configured such that the fasteners extend across the joint interface on one side or the other of the root end of the rotor blade. Accordingly, none of the fasteners penetrate into the end face of the root end or otherwise pierce the material that forms the root end.

A method of making a connecting element for a connection joint at a root end of a wind turbine rotor blade includes providing a mandrel having a top surface, a bottom end, and a pair of side surfaces; arranging finite-length fiber rovings over the top surface of the mandrel to form a fold in the rovings, and bringing the ends of the fiber rovings together to define a through hole in the fiber rovings; infusing resin into the fiber rovings; and at least partially curing the fiber rovings and resin to form a composite article. The resin may be infused into the fiber rovings before (e.g., prepreg) or after (e.g., dry) arranging the fiber rovings on the madrel. The method may further include coupling an insert to a bottom end of the mandrel such that the fiber rovings drape down over the insert and the insert is positioned in the through hole in the fiber rovings. A portion of the through hole and a portion of the insert define an eye in the connecting element. In one embodiment, the step of arranging the fiber rovings comprises stacking a plurality of finite-length fiber plies over the mandrel. The top surface of the mandrel may be generally arcuate to provide a through hole in the composite article having an arcuate portion. The method may further include removing the mandrel from the composite article, and cutting the composite article to form a plurality of connecting elements.

A method of making a wind turbine rotor blade having a root end includes providing a molding apparatus having a molding surface; providing a plurality of connecting elements made as described above; laying a first assembly of fiber plies in the molding apparatus; inserting the plurality of connecting elements in the molding apparatus; laying a second assembly of fiber plies in the molding apparatus, wherein the plurality of connecting elements are generally positioned between the first and second assembly of fiber plies; infusing resin into the first and second assemblies of fiber plies; and curing the fiber plies and resin to form the root end of the rotor blade, wherein the root end includes an end face and a side wall extending therefrom. The connecting elements are arranged such that at least a portion of the through holes in the connecting elements defines bores through the side wall of the root end which are spaced from the end face. The method may further include providing a plurality of anchors in the molding apparatus, wherein the anchors are coupled to the molding surface and extend therefrom; and supporting each of the connecting elements on a respective anchor such that the anchors extend through the through holes in the connecting elements. Moreover, the method may further include removing the anchors from the molding apparatus, and de-molding the root end of the rotor blade from the molding apparatus.

In another embodiment, a wind turbine includes a tower, a nacelle positioned atop of the tower, and a rotor coupled to the nacelle and including a rotor hub having a hub support and at least one rotor blade including a root end having an end face and a side wall extending away from the end face. The root end of the rotor blade is coupled to the hub support by a connection joint. The connection joint includes a plurality of connecting elements integrated into the root end of the rotor blade, wherein each connecting element includes an eye that defines a bore through the side wall of the root end of the rotor blade and which is spaced from the end face. The connection joint further includes a plurality of cross pins received through respective eyes of the connecting elements which form the bores in the side wall of the root end. The cross pins include an exposed portion that extends away from at least one surface of the side wall of the root end of the rotor blade. Further, the connection joint includes a plurality of fasteners, each fastener engaging the exposed portion of the cross pins and coupled to the hub support for securing the root end of the rotor blade to the rotor hub. In one embodiment, the exposed portion of the cross pins extends away from an outer surface and an inner surface of the side wall and a fastener engages the exposed portion extending from both the inner and outer surfaces of the side wall. Each of the plurality of fasteners extends across a connection interface between the rotor blade and the rotor hub to a side of the material that forms the root end of the rotor blade. In this way, none of the fasteners penetrate into the material that forms the root end.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

FIGS. 7A-7D schematically illustrate a method for making the connecting element shown in FIGS. 4-6;

FIGS. 9A and 9B schematically illustrate a molding method for making the root end having the connecting elements integrated therein;

FIG. 15 is a cross-sectional view of the connection joint shown in FIG. 14;

FIG. 16 illustrates a cross pin for the connection joint shown in FIGS. 14 and 15;

FIGS. 17 and 18 illustrate a retention head for the connection joint shown in FIGS. 14 and 15;

FIG. 21 illustrates a cross pin for the connection joint shown in FIG. 20; and

DETAILED DESCRIPTION

Figure 1:
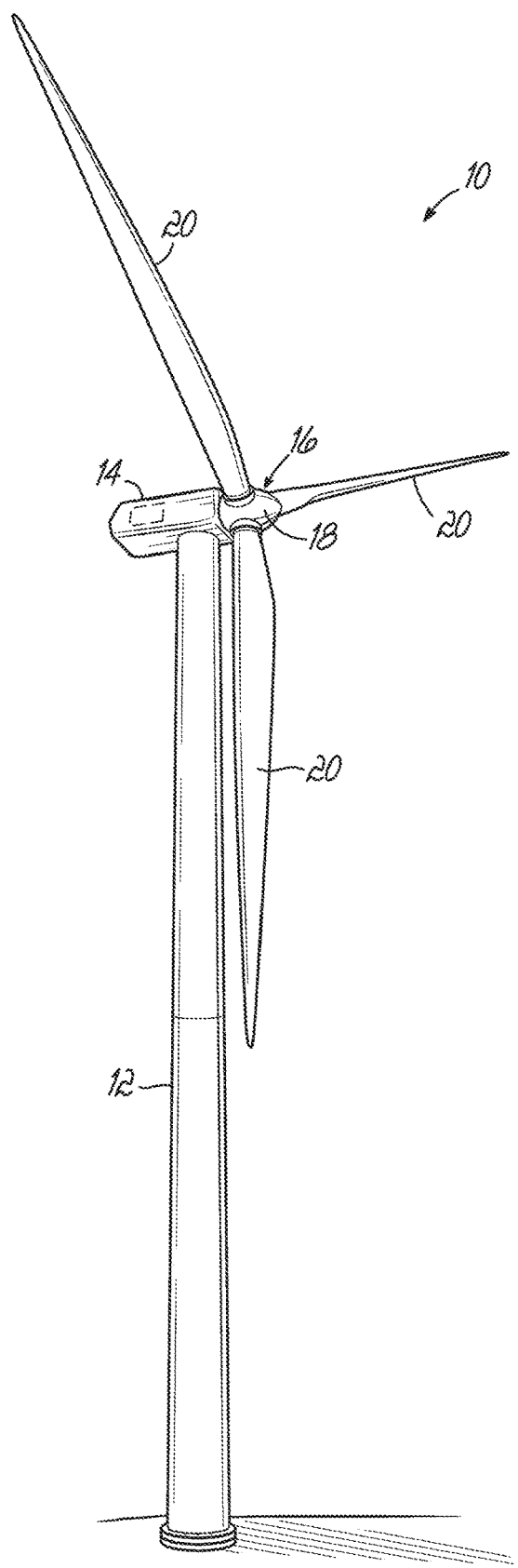
FIG. 1 is a perspective view of a wind turbine in which embodiments of the invention may be used.

With reference to FIG. 1, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a plane substantially perpendicular to the wind direction. The rotor 16 of wind turbine 10 includes a central hub 18 and at least one rotor blade 20 that projects outwardly from the central hub 18 at locations circumferentially distributed thereabout. In the representative embodiment, the rotor 16 includes three blades 20, but the number may vary. The blades 20 are configured to interact with the passing air flow to produce lift that causes the central hub 18 to spin about a central longitudinal axis.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

Figure 2:
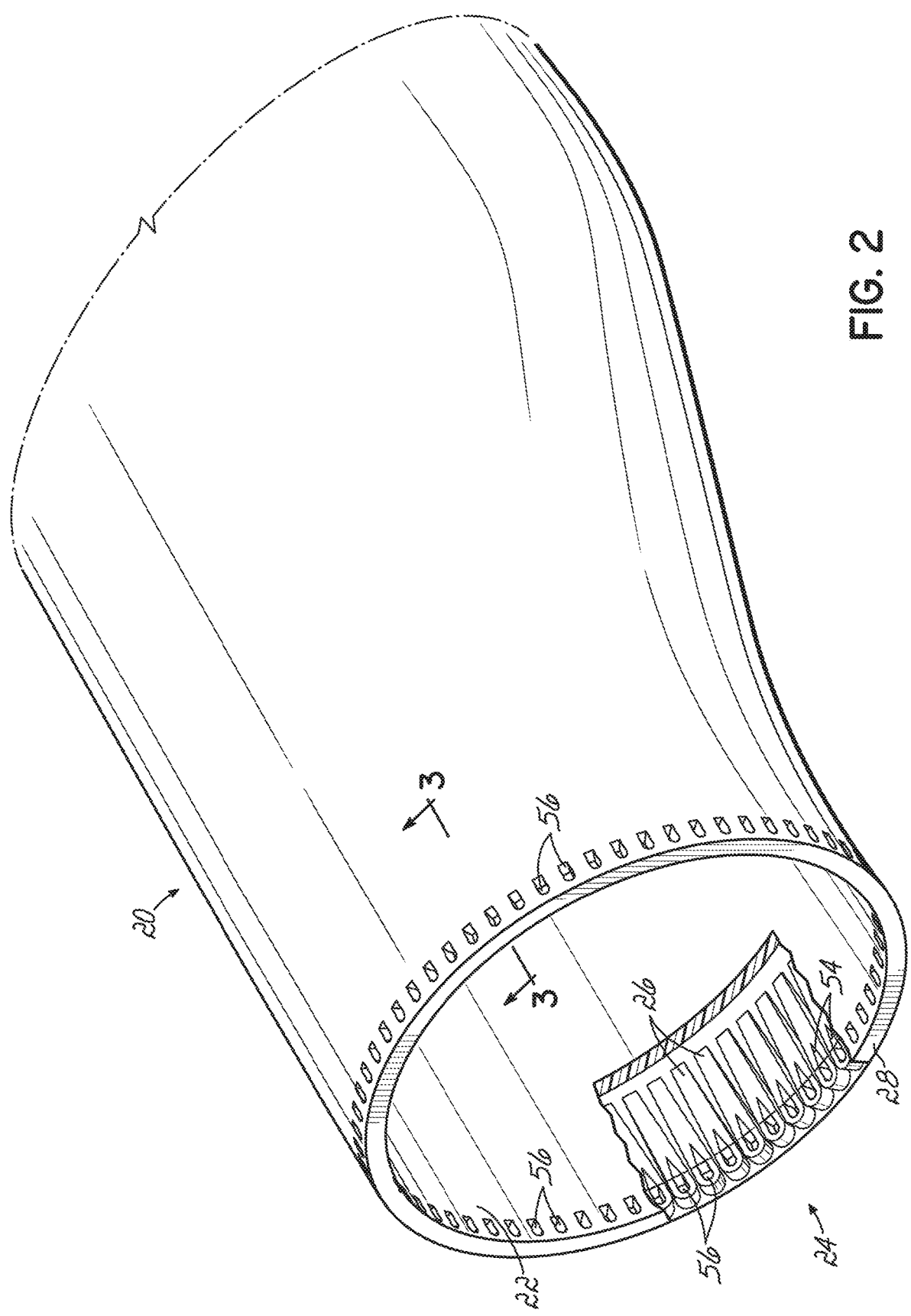
FIG. 2 is a partial perspective view of a root end of a wind turbine blade.

As is well known in the industry, for certain wind turbine designs, the rotor blades 20 are coupled to the rotor hub 18 in a manner that allows the blades 20 to rotate or pitch about a longitudinal axis of the blades 20. This may be achieved by coupling the root end 22 of a blade 20 to a pitch bearing (not shown) operatively coupled to the rotor hub 18. The pitch bearing generally includes a bearing ring rotatable relative to the hub 18 to which the root end 22 of the blade 20 may be coupled. Pitch bearings are generally well known in the art and thus will not be described in further detail herein. In FIG. 2 and in relation to references to a root region of a wind turbine blade 20, an axial direction may refer to a direction extending generally along a longitudinal, spanwise direction of a blade, whereas a radial direction may be a direction extending from a central axis of the blade root out towards or through the root circumference or blade side wall at the root.

Figure 3:
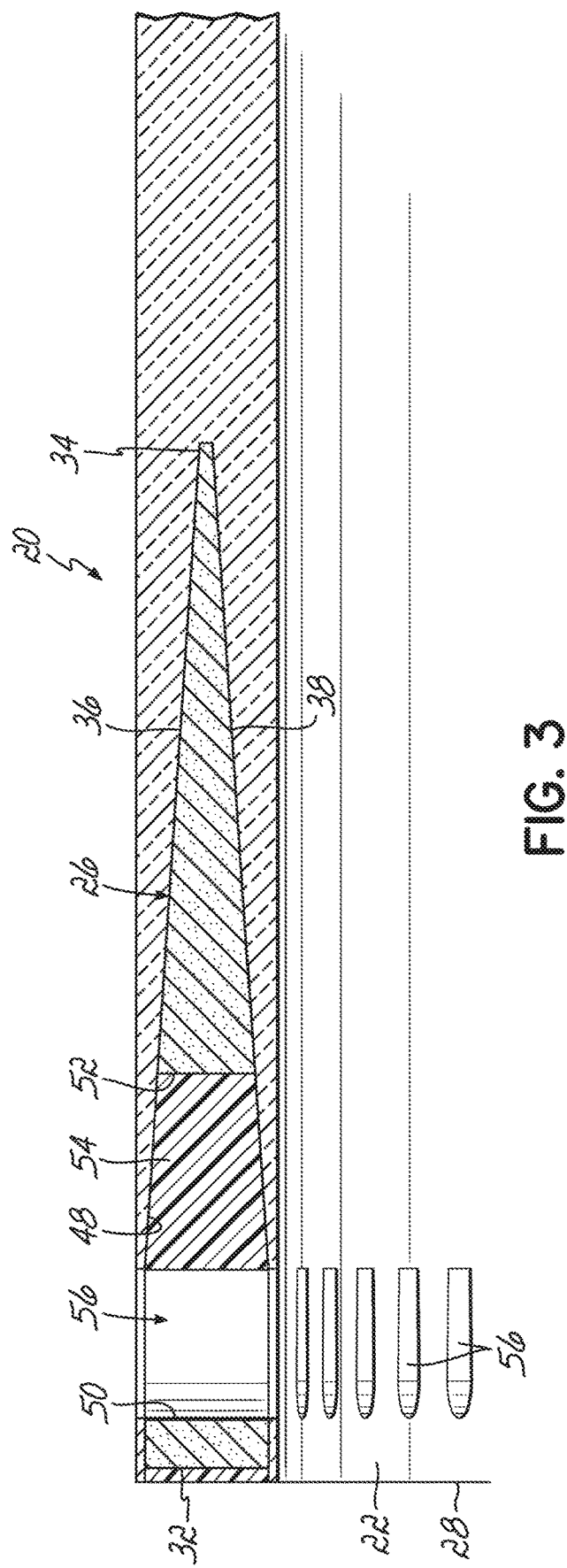
FIG. 3 is a cross sectional view of the root end shown in FIG. 2 taken generally along the line 3-3.

In accordance with an aspect of the invention, and as illustrated in FIGS. 2 and 3, a connection joint 24 between a rotor blade 20 of the wind turbine 10 and the rotor hub 18 includes a plurality of connecting elements 26 integrated into the rotor blade 20 at the root end 22 thereof. As illustrated in these figures, the connecting elements 26 may be circumferentially spaced about an end face 28 at the root end 22 of the blade 20 and embedded within the material that forms the blade 20. A method for integrating the connecting elements 26 within the material of the blade 20 will be described more fully below. The number of connecting elements 26 along the circumference of the root end 22 of the blade 20 depends on the size of the blade, among potential other factors, but may be anywhere from 100 to 250 connecting elements for blades between 50m-80 m in length. It should be realized, however, that more or fewer connecting elements may be used depending on the specific application. As will be explained more fully below, one aspect of the present invention is to allow a close packing of connecting elements without negatively impacting the structural integrity of the root section 22 of the blade 20.

Figure 4:
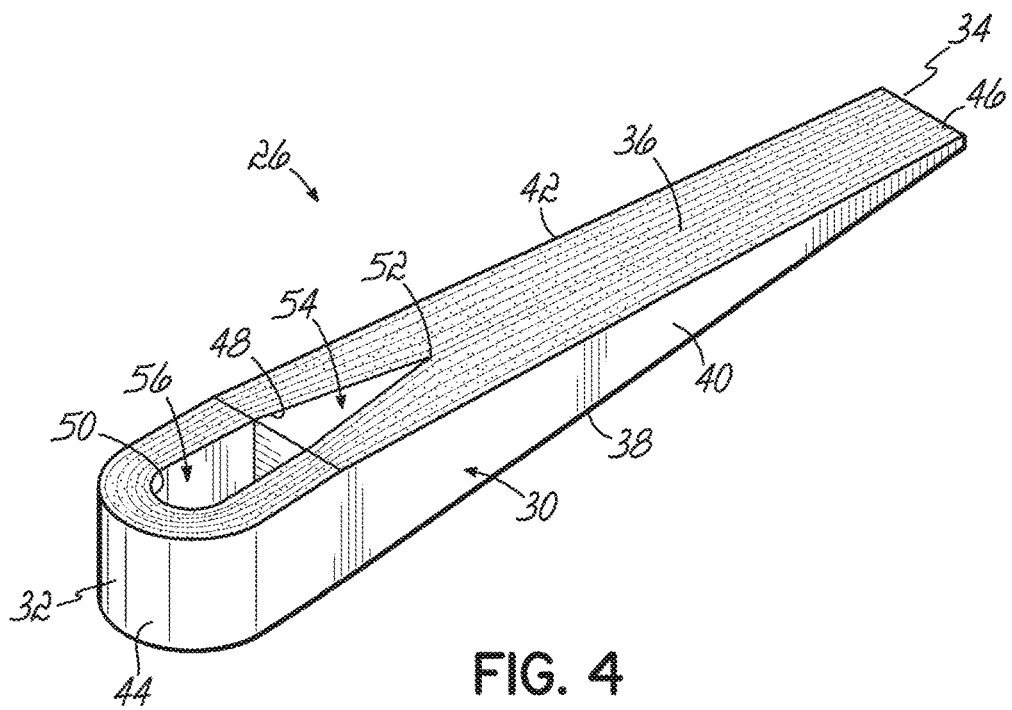
FIG. 4 is a perspective view of a connecting element according to one embodiment of the invention.
Figure 5:
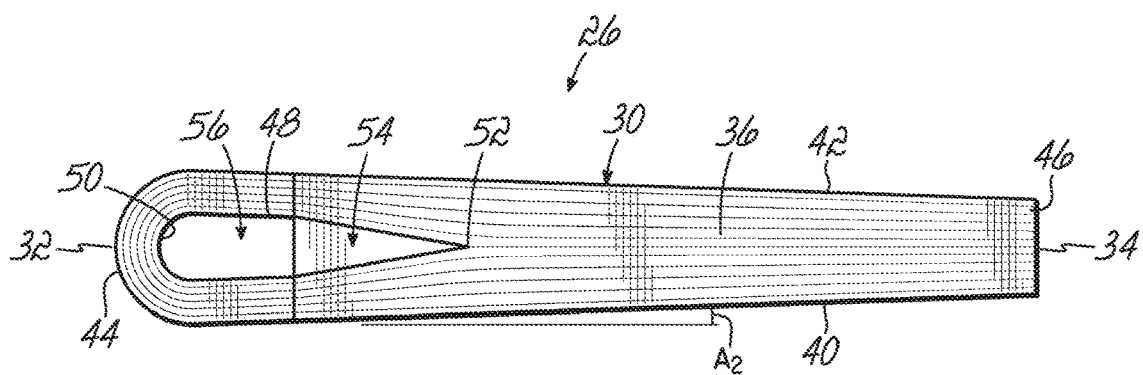
FIG. 5 is top plan view of the connecting element shown in FIG. 4.
Figure 6:
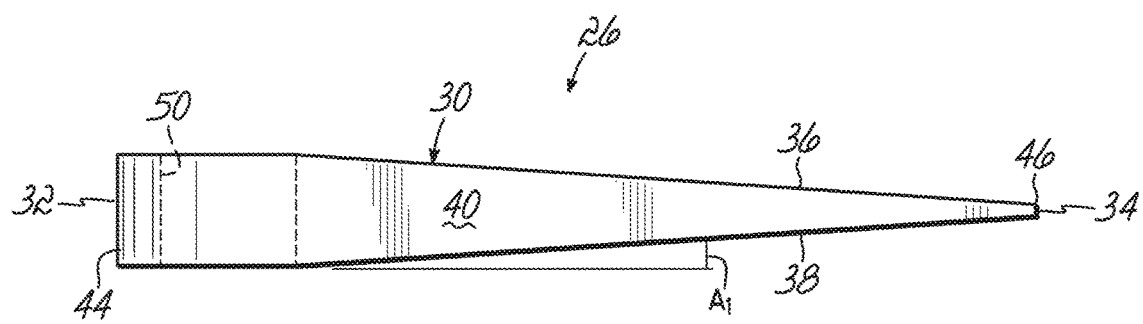
FIG. 6 is a side view of the connecting element shown in FIG. 4.
Figure 7C:
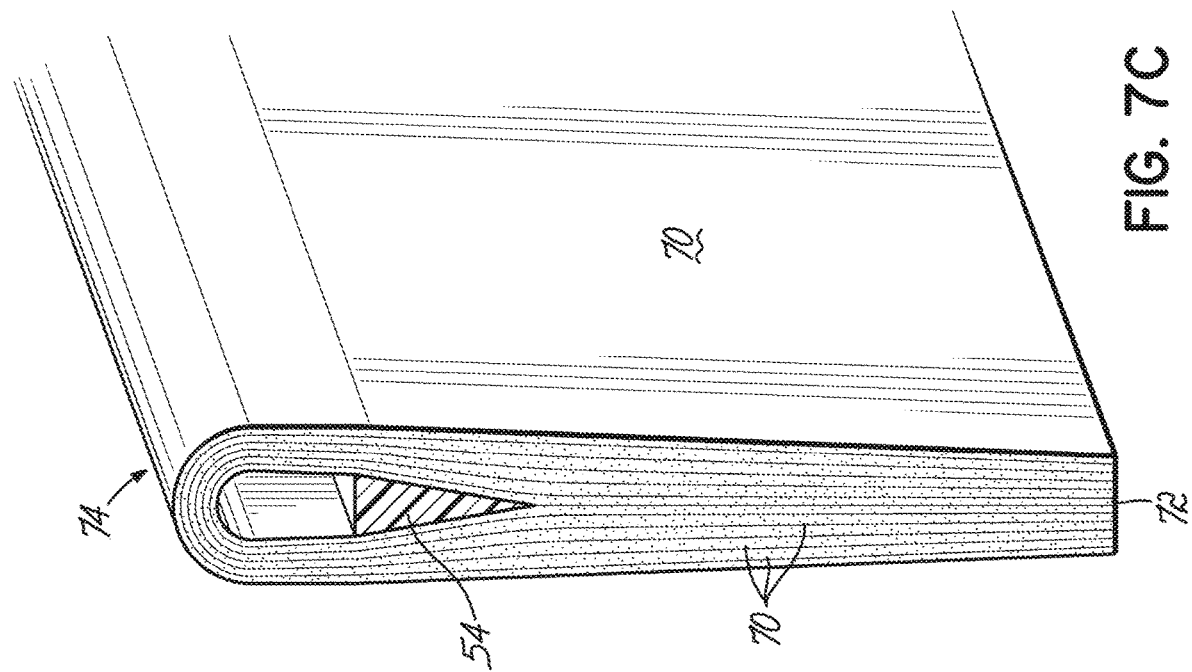
Figure 7B:
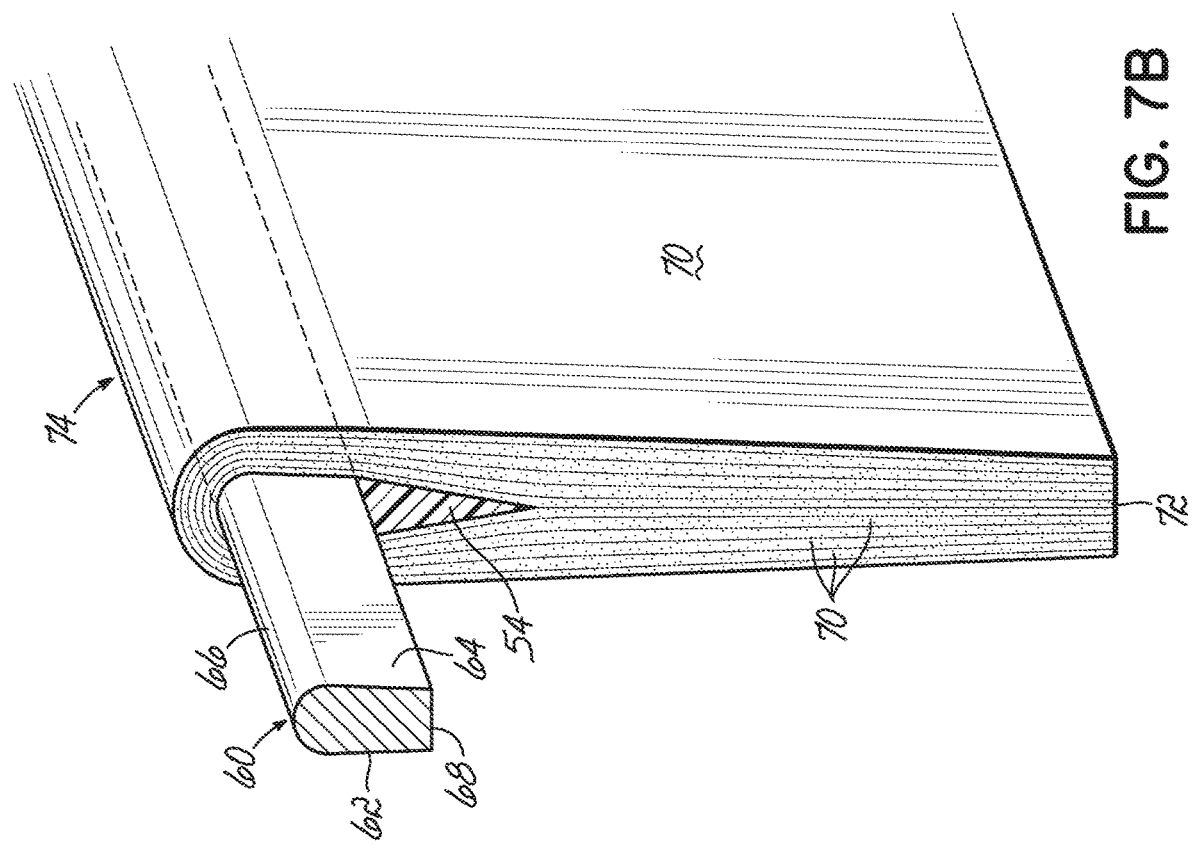
Figure 7D:
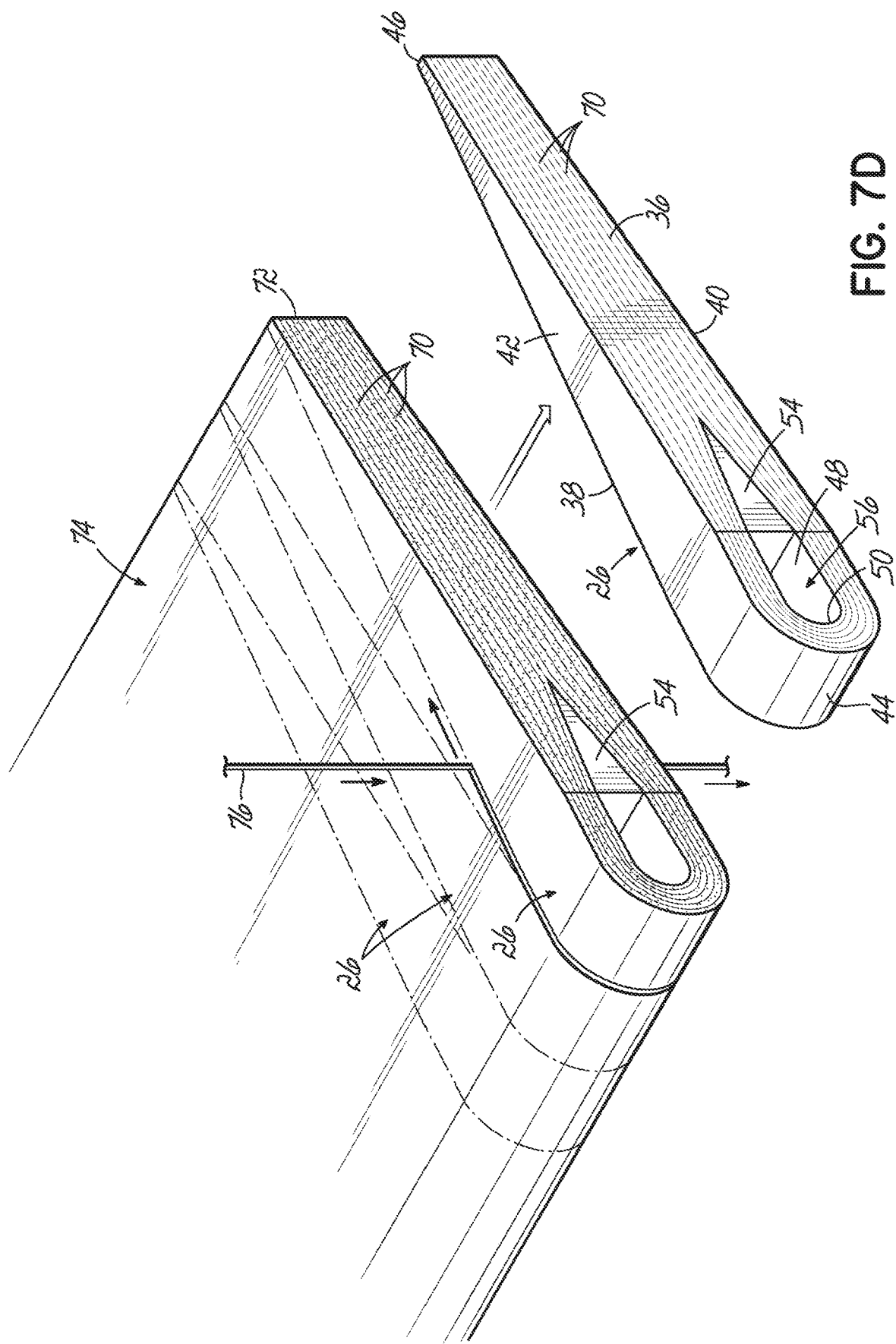
Figure 8A:
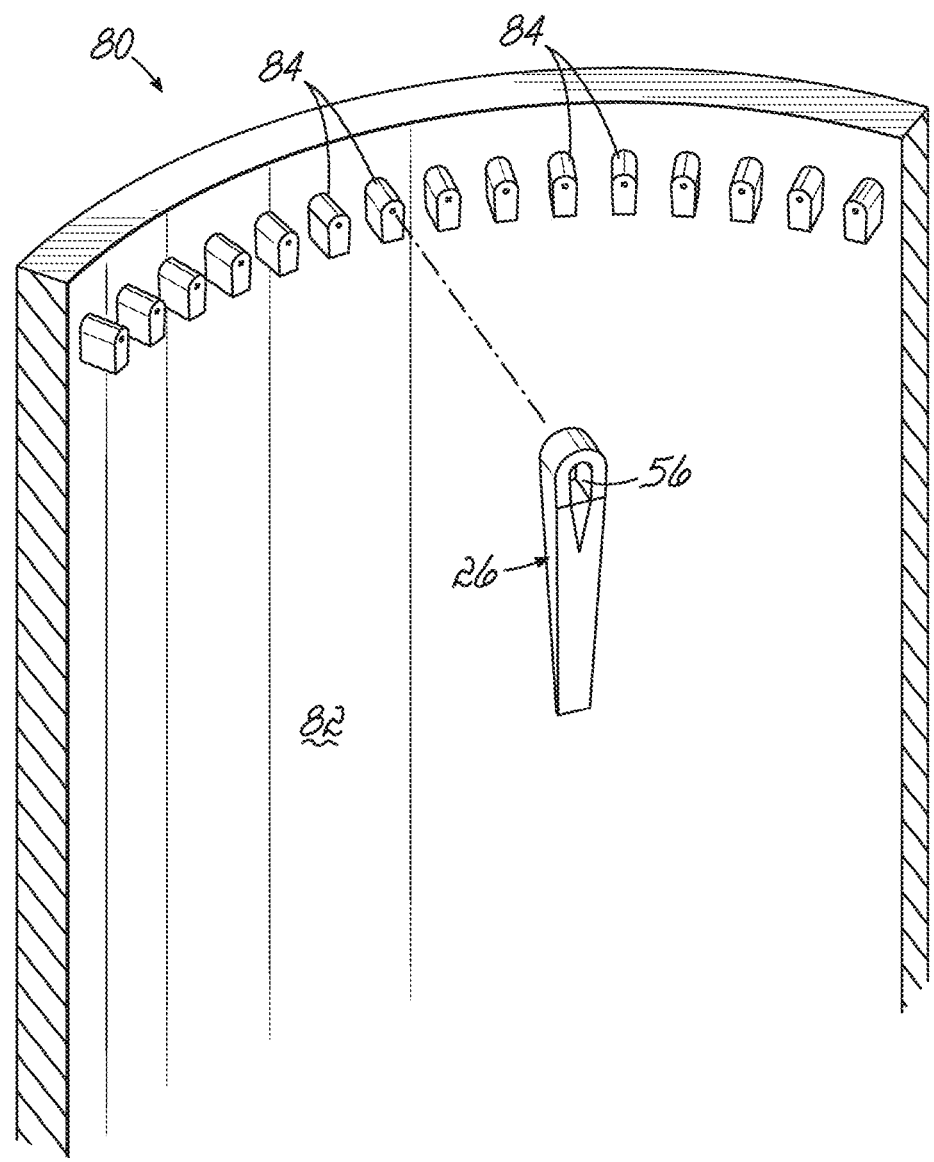
FIGS. 8A and 8B schematically illustrate a molding apparatus for making a root end having the connecting elements integrated therein.
Figure 8B:
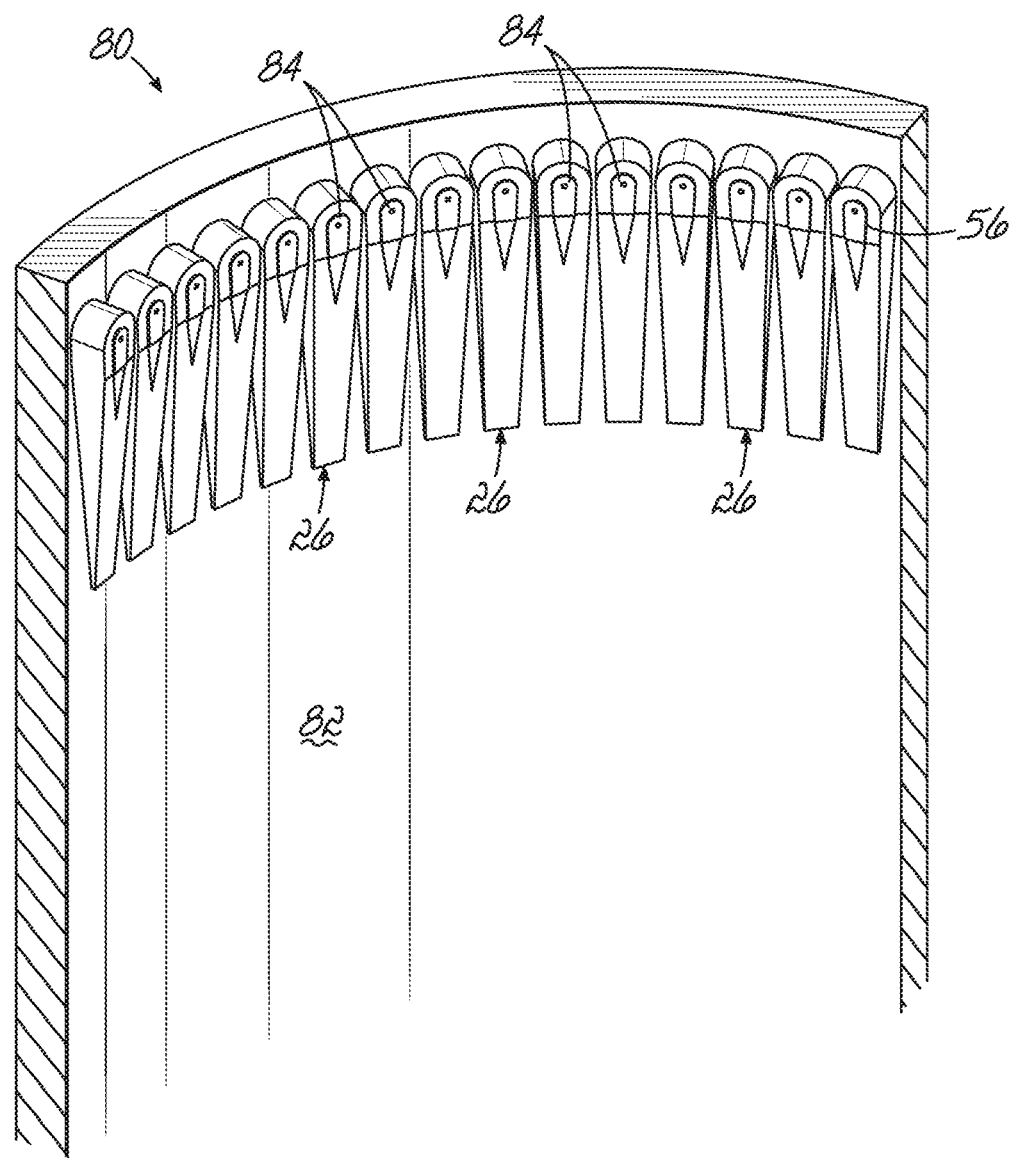
Figure 9B:
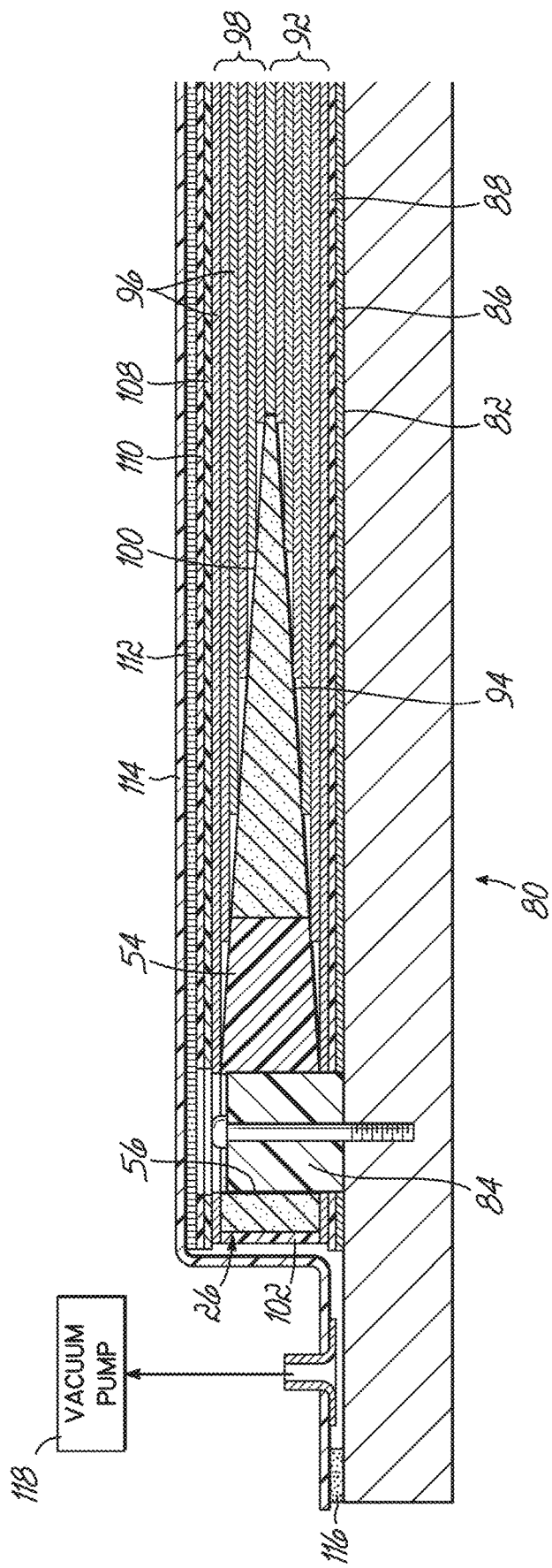
Figure 10:
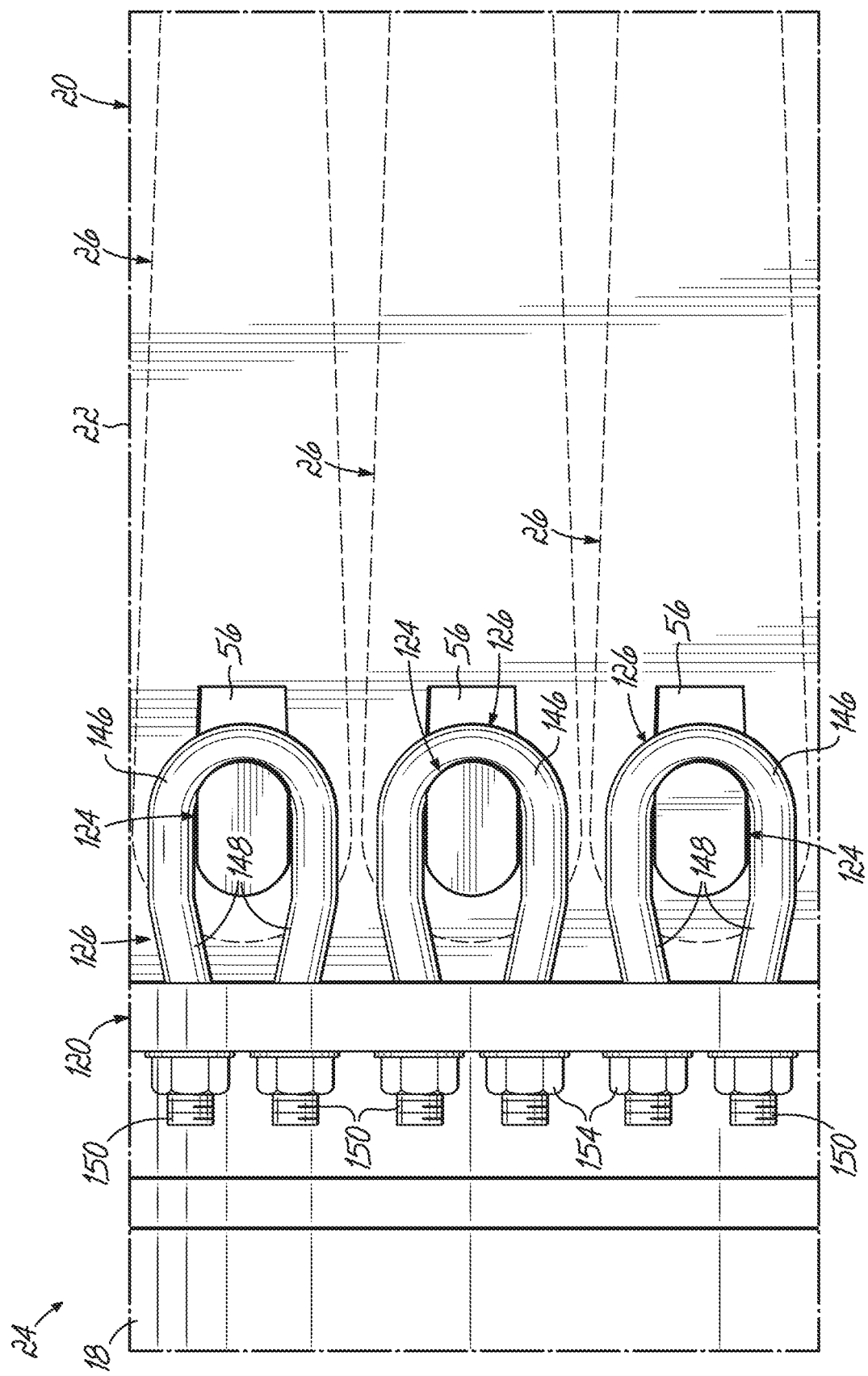
FIG. 10 is an exterior view of a connection joint in accordance with one embodiment of the invention.
Figure 11:
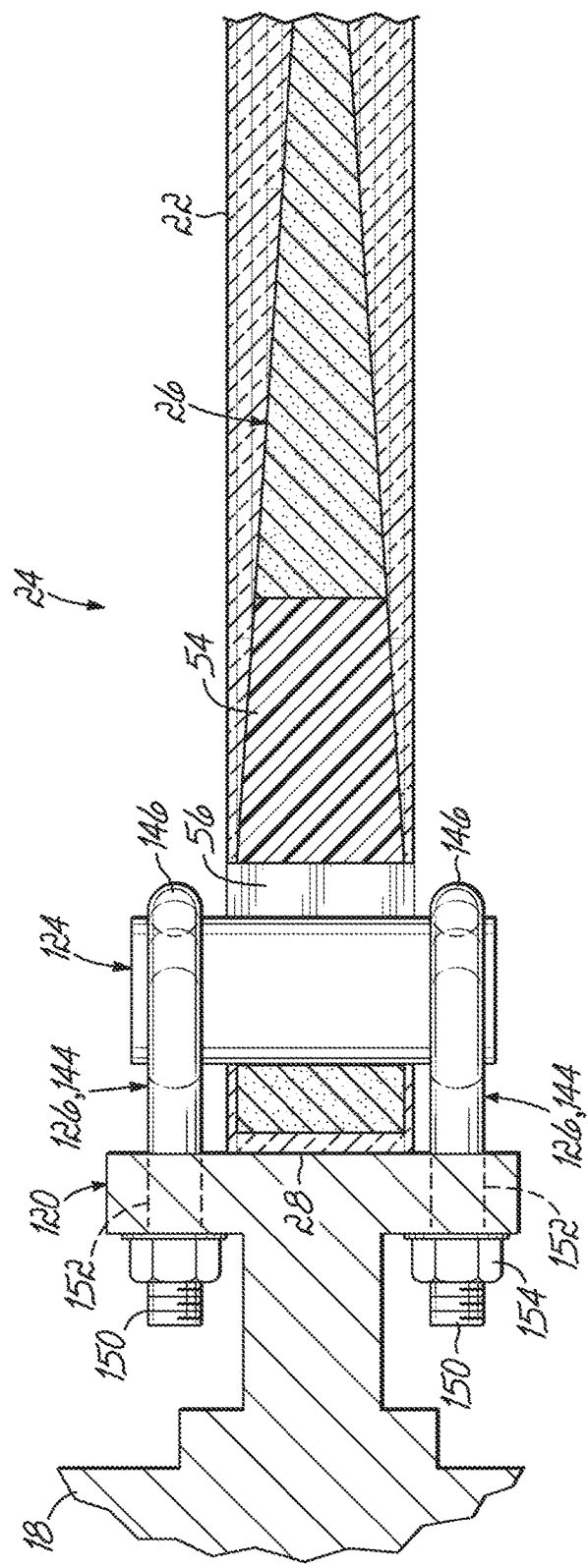
FIG. 11 is a cross-sectional view of the connection joint shown in FIG. 10.
Figure 13:
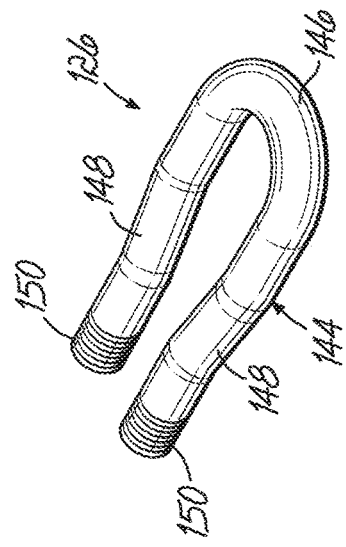
FIG. 13 illustrates a fastener for the connection joint shown in FIGS. 10 and 11.
Figure 12:
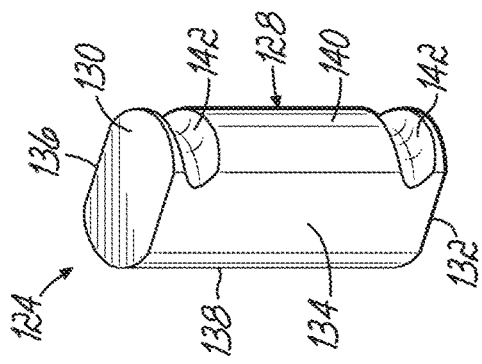
FIG. 12 illustrates a cross pin for the connection joint shown in FIGS. 10 and 11.
Figure 14:
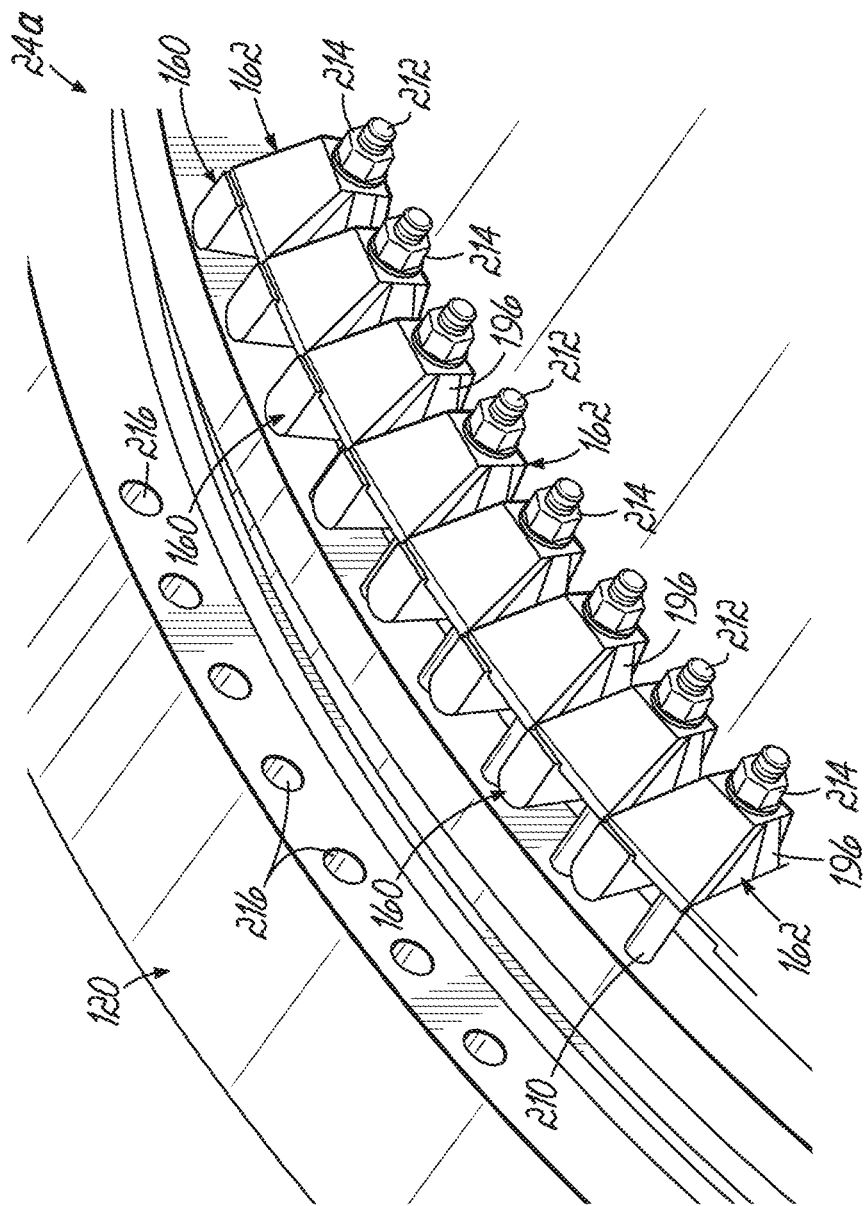
FIG. 14 is an exterior view of a connection joint in accordance with another embodiment of the invention.

In accordance with an aspect of the invention, and as illustrated in FIGS. 4-6, the connecting elements 26 may be formed from a composite material comprising fibers, such as glass or carbon fibers, and a suitable resin material, such as epoxy. This is in contrast to conventional connecting elements, such as those described above, which are typically formed from metals, such as steel. In a preferred embodiment, the connecting elements may be mostly formed, if not entirely formed, by non-metallic materials. By way of example, the connecting elements 26 may be entirely formed from a composite material. Alternatively, the majority of the connecting element (e.g., greater than 50%, and preferably greater than 80%) may be formed from a composite material. Forming the connecting elements 26 entirely or mostly from a composite material not only reduces the weight at the root end 22 of the blade 20, but also reduces the costs associated with the connecting elements since the composite connecting elements 26 may be formed from relatively cheap materials and in a cost effective manner, as will be explained in more detail below. Furthermore, forming the connecting elements 26 from composite materials may further allow the connecting elements 26 to be integrated into the material of the blade (which is typically also formed from a composite material) in a manner that provides an increase in the strength of the connection joint 24.

In an exemplary embodiment, a connecting element 26 may be configured as an elongated wedge-shaped member 30 having a head end 32, a tip end 34, a top surface 36, a bottom surface 38, a first side surface 40, a second side surface 42, a head end surface 44 and a tip end surface 46. The top and bottom surfaces 36, 38 may be generally planar or consist of generally planar portions, and converge toward each other in a direction toward the tip end 34 of the connecting element 26 along at least a portion of the length of the connecting element 26. By way of example and without limitation, the top and bottom surfaces 36, 38 may converge toward each other for the entire length of the connecting element 26. Alternatively, the top and bottom surfaces 36, 38 may be generally parallel to each other for a short distance from the head end 32, for example for about 5%-10% of the total length of the connecting element 26, and then converge toward each other along the remaining length of the connecting element 26. In an exemplary embodiment, the taper angle $A_1$ of the top and bottom surfaces 36, 38 may be between about 2 and 30 degrees, preferably between about 4 and 25 degrees, still preferably between about 5 degrees and about 15 degrees. Other valves for the taper angle $A_1$ may also be possible. The wedged configuration of the connecting element 26 facilitates the integration of the connecting element 26 into the material of the root end 22 of the blade 20 and increases the bond strength between the connecting element and the material in which it is integrated.

In addition to the above, and as illustrated in the figures, the first and second sides 40, 42 of the connecting element 26 may also be tapered in a direction toward the tip end 34 of the connecting element. By way of example and without limitation, the first and second side surfaces 40, 42 may converge toward each other for the entire length of the connecting element 26. Alternatively, the first and second side surfaces 40, 42 may be generally parallel to each other for a short distance from the head end 32, for example for about 5%-10% of the total length of the connecting element 26, and then converge toward each other along the remaining length of the connecting element 26. In an exemplary embodiment, the taper angle $A_2$ of the first and second side surfaces 40, 42 may be between about 2 degrees and about 10 degrees. Other valves for the taper angle $A_2$ may also be possible. The tapering in the sides 40, 42 of the connecting element 26 provides an increased contact area between the connecting element 26 and the material of the blade in a region between adjacent, circumferentially spaced connecting elements 26. Again, this increases the bond strength between the connecting element and the surrounding material.

As further illustrated in the figures, the head end surface 44 may have a curved or arcuate configuration and smoothly transition to the first and second side surfaces 40, 42. By way of example and without limitation, the head end surface 44 may be generally circular with a radius of curvature $R_1$ between about 1 cm and about 6 cm, preferably between about 1.5 cm and 4 cm. Furthermore, the connecting element 26 may include a through hole 48 adjacent the head end 32 of the connecting element 26 which extends from the top surface 36 to the bottom surface 38. For reasons that are more fully described below, the through hole 48 has an arcuate (e.g., semicircular) first end 50 and a generally v-shaped second end 52. An insert 54 may be positioned in the through hole 48 so as to substantially fill a portion of the through hole 48 adjacent the v-shaped second end 52. The insert 54 is configured to only fill a portion of the through hole 48, and thereby define a passage or eye 56 adjacent the first end 50 of the through hole 48 which extends from the top surface 36 to the bottom surface 38. In one embodiment, the insert 54 may be generally triangularly shaped and be formed from a composite material. The composite material of the insert 54 may be the same or different than the composite material of the remaining portions of the connecting element 26. By way of example, the insert 54 may be formed from a glass or carbon fiber and a resin material, such as a suitable epoxy resin. However, other materials may also be used to form the insert 54. In embodiments, the insert may be formed from wood such as balsa wood or balsa wood impregnated for additional stiffness. In still further aspects, the insert 54 may be made from a resin material or other plastics material. Preferably, the material od the insert 54 may have a thermal expansion coefficient similar to the thermal expansion coefficient of the resin-embedded rovings. These materials should be compatible with the composite material of the body 30 so as to provide a strong bond therebetween. A top surface of the insert 54 may be selected such that the eye 56 has a desired shape. For example, the top surface may be flat or may be curved. In general, the bore, or eye 56 may be said to extend through the side wall in a radial direction.

In the disclosed embodiment, the eye 56 in the connecting element 26 may be bounded in part by the insert 54 and in part by the member 30 that forms the connecting element 26. In one aspect of the invention, the through hole 48 and the eye 56 through the connecting element 26 is not formed by a drilling or machining operation that tends to cut or otherwise break the fibers of the body 30, thereby creating fiber ends at the boundary of the drilled or machined bores. In this regard, for example, the radial bores through the side wall of the root section for the T-joint described above are typically formed by a drilling operation that cuts the fibers at the boundary of the radial bores. In contrast to this process, the through holes 48 of the connecting elements 26 may be formed without a post drilling or milling operation, and without cutting or breaking the fibers that form the connecting elements 26. It is believed that providing a through hole 48 and an eye 56 that is not the result of a drilling or milling process, such that the boundary of the through hole 48 or eye 56 is not formed by cut ends of the fiber material will increase the strength of the root section 22 in the area of the eye 56. This is particularly relevant because the forces on the blades 20 are transferred to the rotor hub 18 through this region. As explained below, this is achieved by folding finite length fiber rovings to form the through hole in the connecting element.

FIGS. 7A-7D schematically illustrate an exemplary process for forming the connecting elements 26 having an eye 56 as described above. In this regard, an elongate mandrel 60 may be provided having a U-shaped or D-shaped cross sectional profile. Such a profile provides a pair of opposed, generally planar side surfaces 62, 64 and an arcuate or curved top surface 66. The shape of the top surface 66 may be selected so as to correspond with the shape of the first end 50 of the through hole 48. Thus in one embodiment, the top surface 66 may be semicircular with a radius of curvature between about 0.4 cm and about 2 cm, preferably between about 0.4 cm and about 2 cm; preferably between about 0.5 cm and 1.5 cm. This range should be between 10% and 50% below the radius of curvature of the head and surface 44. A bottom side 68 of the mandrel 60 may be closed off by a surface or be open. The mandrel 60 may be formed of metal or other suitable material known to those of ordinary skill in the art.

The insert 54 that is eventually coupled to the through hole 48 to form the eye 56, which may be provided as an elongate member having the desired cross-sectional configuration (e.g., triangular), may be temporarily secured to the bottom side 68 of the mandrel 60 so as to depend therefrom. At this point, a plurality of finite length fiber rovings may be essentially folded over the top surface 66 of the mandrel 60 such that the fiber rovings drape down from the side surfaces 62, 64 of the mandrel 60. The center region of the fiber rovings are adjacent the top surface 66 of the mandrel 60 and the ends of the fiber rovings are then brought together at a tip end 72. Accordingly, the fiber rovings generally conform to the shape of the top and side surfaces 66, 62, 64 of the mandrel 60 and to the side surfaces of the insert 54 depending from the bottom side 68 of the mandrel 60. Bringing the ends of the fiber rovings together provides a tapering configuration that provides the taper in the first and second side surfaces 40, 42 in the connecting element 26. The fiber rovings may be provided by stacking a plurality of fiber sheets or plies 70. The fiber plies 70 may be dry fiber plies or resin-impregnated fiber plies (e.g., pre-preg) either uncured, partially cured or combinations thereof. The fiber plies 70 may further be unidirectional fiber plies, biaxial fiber plies, or a combination thereof in a wide range of ordered configurations (e.g., a repeated pattern of three unidirectional plies and one biaxial plies). The number of fiber plies 70 that are stacked onto the mandrel 60 may be selected so as to provide the desired width in the connecting element 26. Additionally, the length of the fiber plies 70 may be selected so as to provide the desired length in the connecting element 26. The width of the fiber plies 70 may be selected so as to fit on the length of the mandrel 60. As explained below, ultimately, the composite article formed from this process will be subject to further processing so as to provide a plurality of connecting elements 26.

Once the layup process of the fiber plies 70 on the mandrel 60 is complete, the article 74 may be fully cured or at least partially cured by a suitable curing process known to those of ordinary skill in the art. Subsequent to the curing process, the article 74 may be removed from the mandrel 60 such that the article 74 includes the fiber plies 70, resin, and the insert 54 formed together. From here, the article 74 may be subject to post processing techniques to form a plurality of connecting elements 26 from the article 74. In this regard, the article 74 may be subject to a cutting operation (e.g., from a wire cutter 76) so as to form discrete connecting elements 26. As can be appreciated, the cutting operation on the article 74 forms the top and bottom surfaces 36, 38 of the connecting element 26. The cutting operation is configured so as to form the tapered configuration in the thickness direction of the connecting elements 26.

The process described above results in each of the connecting elements 26 having the shape and geometry described above. The process is particularly beneficial for producing a through hole in the connecting element without cutting the fibers that form the composite member. In particular, the head end 32 of the connecting elements 26 may be formed by the longitudinal side surfaces of continuous strands of fibers. There are essentially no fiber ends at the boundary of the through hole 48. The connecting element with through hole may be thought of as a folded roving of fibers that through the folding of the fibers creates an eye through the element. For this reason the connecting elements 26 may be referred to as roving eyes. In any event, the arrangement of the fibers in the roving eye which create the through hole as part of the fiber arrangement is believed to significantly increase the strength of the connection joints. The connecting elements 26 may vary in size as required by the application. In an exemplary embodiment, a connecting element may have a length between about 15 cm and about 1.5 m; preferably between about 25 cm and about 1 m; a width (at the head end) between about 20 cm and about 6 cm; and a height (at the head end) between about 4 cm and about 15 cm. These ranges are merely exemplary and the invention is not limited to these values.

With the individual connecting elements 26 now formed through, for example, the process described above, the integration of the connecting elements 26 into the root end 22 of the rotor blade 20 will now be described in more detail. In this regard, FIGS. 8A-9B schematically illustrate an exemplary method of integrating the connecting elements 26 into the blade 20. In one embodiment, the root end 22 of the blade 20 may be formed through a molding process using a molding apparatus 80 defining a contoured inner surface 82 for defining the root end 22 of the blade 20. A plurality of pegs or anchors 84 may be removably secured to the inner surface 82 of the molding apparatus 80 adjacent a first end of the mold. The number and position of anchors 84 may correspond to the number and position of connecting elements 26 desired in the design of the connection joint 24. The anchors 24 may be formed from a suitable thermoplastic polymer that facilitates removal of the molded root end 22 from the molding apparatus 80 after curing (e.g., having desired thermal expansion properties). By way of example and without limitation, the anchors 84 may be formed from polytetrafluoroethylene (PTFE). Other materials, however, may also be acceptable.

The molding method may include placing a release agent 86 such as a liquid release coating, a wax, or a solid barrier (e.g., Teflon® tape) over the inner surface 82 of the molding apparatus 80. An optional layer (not shown) of release material (e.g., film) may then be applied over the release agent 86. In addition, a first optional layer of peel ply 88 may be applied over the release material layer, if present, or directly over the release agent 86. Next, several layers 90 of the fiber fabric may be placed over one another (e.g., stacked) to define an assembly of layers 92, until a desired, predetermined thickness is reached in accordance with the design. The fiber fabric may include glass fiber, carbon fiber or other material or combination of materials known to those of ordinary skill in the art. The fiber fabric may be resin-impregnated (e.g., a pre-preg) or be dry. The layers 90 of the first assembly 92 may be laid up in the molding apparatus 80 so as to define a taper 94 in the material.

After the first assembly of layers 92 has been laid in the molding apparatus 80, the connecting elements 26 may be located in the mold. In this regard, the anchors 84 may have a shape that corresponds to the shape of the eye 56 in the connecting elements 26 such that the connecting elements 26 may be hung or supported from the anchors 84. The taper of the bottom surface 38 of the connecting elements 26 generally correspond to the taper 94 of the first assembly of fiber layers 92. After locating the connecting elements 26 in the molding apparatus 80, additional layers 96 of the fiber fabric may be placed over one another to define a second assembly of layers 98, until a desired, predetermined thickness is reached in accordance with the design. Similar to above, the fiber fabric may include glass fiber, carbon fiber or other material or combination of materials known to those of ordinary skill in the art. The fiber fabric may be resin-impregnated or be dry. The layers 96 of the second assembly 98 may be laid up in the molding apparatus 80 so as to define a taper 100 in the material. The taper 100 in the material may generally correspond to the taper in the top surface 36 of the connecting element 26.

In accordance with an aspect of the invention, the root end 22 of the blade 20 may include a composite rim support 102 above the head ends 32 of the connecting elements 26. In this regard, the space between the head ends 32 of adjacent connecting elements 26 (resulting from the arcuate shape of the head ends) may be filled with a dry or resin-impregnated fiber material. By way of example, if the connecting elements 26 are next to each other, a wedge-shaped fiber insert (not shown) may be positioned in the space such that there are essentially no gaps in fibrous material in the region of the head ends 32 of the connecting elements 26. Additional fiber layers may be added above the head ends 32, such as that provided by a fiber tape or bandage. It is the outermost layer of the fiber tape that will result in the end face 28 at the root end 22 of the rotor blade 20. Thus, between the first and second assemblies 92, 98, the fiber inserts 104 and the layers of fiber tape 106, the connecting elements 26 are essentially embedded and integrated within the composite material of the root end 22 of the blade 20.

Once this assembly is reached, a second optional peel ply 108 made, for example, of nylon or some other tightly woven fabric impregnated with a release agent, may be applied over the formed assembly. Once the second optional peel ply 108 is in place, a layer 110 of release film may be applied thereover. In this embodiment, a breather or bleeder material layer 112 may then be applied over the second optional peel ply 108, which is configured to absorb excess resin and let gases escape during formation of the composite laminate. With continued reference to FIGS. 9A and 9B, a vacuum bag 114 may be placed over the above-mentioned layers and secured in place against the molding apparatus 80 via a securing element 116, such as a bag sealant tape, and a vacuum source 118 actuated. Actuation of the vacuum source 118 is effective to pull the bag 114 toward the inner surface 82 of the molding apparatus 80 so as to give shape to the root end 22 of the blade 20. The vacuum source 118 is also effective to remove air as well as excess resin from the assembly of fiber layers and resin. When the fiber layers are not pre-impregnated with resin, but are instead dry layers of fiber, a resin distribution system (not shown) may be placed in communication with the layers under the vacuum bag 114 and used to distribute resin to the fiber layers. These steps are generally known in the art and will not be described in further detail.

In a subsequent step, the resulting assembly is allowed to cure or at least partially cure within the molding apparatus 80, such as through a heating process. Once cured or at least partially cured, the anchors 84 may be removed from molding apparatus 80 and the root end 22 removed from the molding apparatus 80. As noted above, the root end 22 of the blade 20 now includes radial openings or bores provided by the eyes 56 of the connecting elements 26. Again, these bores were not formed from a drilling or machining process, but in the formation of the root end 22 of the blade 20 itself, and more particularly in the formation of the connecting elements 26 which are integrated into the root end 22 of the blade 20.

With an improved design of the root end 22 of the wind turbine blade 20 as described above, various embodiments will now be described directed to the coupling of the rotor blade 20 to the rotor hub 18 using the connecting elements 26. In this regard and in further reference to the figures, the root end 22 of the blade 20 may be coupled to a wide variety of structural elements associated with the rotor hub 18. The structural elements to which the root end 22 of the blade 20 may be coupled will be broadly referred to herein as a hub member 120. In one embodiment, the hub member may be a ring of a blade bearing that permits the blade 20 to rotate relative to the hub 18. For example, the hub member may be the inner or outer ring of the blade bearing (depending on the particular design). Additionally or alternatively, the hub member may be a flange which is coupled to a blade bearing or to the rotor hub directly. Thus, the hub member is a structural aspect associated with the rotor hub 18 to which the root end 22 of the blade is secured and the invention should not be limited to any particular structural element.

In one exemplary embodiment illustrated in FIGS. 10-13, the connection joint 24 further includes a plurality of slide members or cross pins 124 configured to be engaged with respective eyes 56 of the connecting elements 26, and a plurality of fasteners 126 for coupling the cross pins 124 to the hub element 120. The cross pins 124 have a cross-sectional shape that generally matches the shape of the eyes 56 that extend through the connecting elements 26. In this embodiment, the cross pins 124 include an elongate body 128 having generally planar top and bottom surfaces 130, 132, first and second generally planar side surfaces 134, 136, a generally arcuate first end surface 138, and a second end surface 140. The size of the cross pin 124 is such as to fit within the eye 56 of the connection elements 26. The first end surface 138 may be curved to generally correspond to the curvature of the head end of the eye 56 and thereby distribute forces in an efficient manner. The second end surface 140 may in one embodiment be generally planar and correspond to a generally planar surface of the insert 54. Alternatively, however, the second end surface 140 may also be generally arcuate having, for example, a radius of curvature substantially equal to the radius of curvature of the first end surface 138. Further, the second end surface 140 may further include a pair of spaced apart grooves 142 that extend across the end surface 140 in a direction generally transverse to a longitudinal direction of the cross pin 124. The grooves 142 may be generally arcuate in cross section, however other shapes are possible. In an exemplary embodiment, the cross pins 124 may be formed from metal, such as steel. However, other suitable materials may also be possible and within the scope of the invention.

To facilitate a coupling between the blade 20 and the rotor hub 18, the cross pins 124 may be inserted through the eyes 56 of the connecting elements 26. The cross pins 124 extend beyond the thickness or height of eyes 56 so that a portion of the cross pins 124 extends above and/or below the material that forms the root end 22 of the blade 20. In other words, the cross pins 124 may extend exterior and interior of the side wall that forms the root end 22. The grooves 142 in second end surface 140 are positioned on the cross pins 124 so as to be exposed above and below the material that forms the root end 22 of the blade 20. With the cross pin 124 so positioned relative to the eyes 56 of the connecting elements 26, fasteners in the form of U-shaped bolts 144 may be used to secure the root end 22 of the blade 20 to the hub member 120. In this regard, the U-shaped bolts 144 include a central portion 146 and opposed legs 148 with threaded ends 150. The central portion 146 of the U-bolts 144 may be positioned in each of the grooves 142 in the second end surface 140 of the cross pins 124 and the legs 148 extend beyond the end face 28 of the root end 22 and may be received within bores 152 in the hub member 120, which in one embodiment may be a flange extending from a ring of the blade bearing. Suitable nuts 154 may be threadably engaged with the threaded ends 150 of the U-shaped bolts 144 to secure the root end 22 of the blade 20 to the hub member 120. The connection of the U-bolts 144 may be done on at least one of and preferably both of the exterior and the interior of the root end 22. This arrangement essentially clamps the end face 28 at the root end 22 of the blade 20 tightly up against the hub member 120 to thereby secure the blades 20 to the hub 18.

One beneficial aspect of the arrangement described above is that the structural elements through which forces are transferred between the blades 20 and the hub 18 and which extend across the joint interface (e.g., the U-bolts in the embodiment described above) do not extend through or into the material that forms the root end 22 of the blade 20. In the arrangement above, those structural elements are both above and below (e.g., exterior and interior to) the material that forms the root end 22 of the blade 20. No axial holes have to be drilled or otherwise formed in the material that makes up the root end 22 of the blade 20. This results in less material being removed from the root end thereby providing a stronger connection joint 24. Furthermore, the forces that are transferred between the blades 20 and the hub 18 occur through the contact area between the cross pins 124 and the eyes 56 of the connecting elements 26. As noted above, the fibers that form the head end 32 of the connecting elements 26 are not cut or otherwise broken in this region and thus this design constitutes an extremely strong connection interface. Accordingly, it is believed that the connection joint 24 as described above provides a stronger joint for a fixed size of root end, and thus is capable of accommodating increased loading on the blades 20 without a corresponding increase in interface size. It is further believed that the design is also more cost effective for the strength provided by the joint. In other words, a conventional connection joint (e.g., T-joint) having the same strength as provided by the present design would be considerably larger and more costly.

In another exemplary embodiment illustrated in FIGS. 14-18, the connection joint 24a further includes a plurality of slide members or cross pins 160 configured to be engaged with respective eyes 56 of the connecting elements 26, a plurality of retention blocks or heads 162, and a plurality of fasteners 126 for coupling the cross pins 160 to the hub element 120. The cross pins 160 have a cross-sectional shape that generally matches the shape of the eyes 56 of the connecting elements 26. By way of example, in this embodiment the cross pins 160 include an elongate body 164 having generally planar top and bottom surfaces 166, 168, first and second generally planar side surfaces 170, 172, a generally arcuate first end surface 174, and a second end surface 176. The size of the cross pin 124 is such as to fit within the eye 56 of the connection elements 26. The first end surface 174 may be curved to generally correspond to the curvature of the head end of the eye 56 and thereby distribute forces in an efficient manner. The second end surface 176 may in this embodiment be generally planar and correspond to a generally planar surface of the insert 54. The second end surface 176 further includes lips 178 projecting therefrom and adjacent the top and bottom surfaces 166, 168. In an exemplary embodiment, the cross pins 160 may be formed from metal, such as steel. However, other suitable materials may also be possible and within the scope of the invention.

The retention heads 162 include a generally rectangular main body 180 having a generally planar top surface 182, bottom surface 184, first side surface 186, second side surface 188, first end surface 190, and second end surface 192. The main body 180 includes a through bore 194 extending between the first and second end surfaces 190, 192. The first side surface 186 includes a generally triangular leg 196 extending therefrom such that the base of the triangular leg 196 defines a contact surface 198 substantially flush (e.g., planar) with the first end surface 190 of the main body 180. The leg 196 is centrally located along the height of the first side surface 186 to define a pair of gaps 200 on either side of the leg 196 and within the height of the first side surface 186. Similarly, the second side surface 188 includes a pair of spaced apart generally triangular legs 202, 204 extending therefrom such that the base of the triangular legs 202, 204 defines contact surfaces 206 substantially flush (e.g., planar) with the first end surface 190 of the main body 180. The legs 202, 204 are located at the upper and lower most edges of the second side surface 190 to define a central gap 208 on either side of the leg 196 and within the height of the first side surface 186. The height of the central gap 208 is substantially equal to the height of the leg 196. In this way, the leg 196 of a retention head 162 may be received in the central gap 208 of an adjacent retention head 162. This arrangement provides on overlap and interlock between adjacent retention heads 162, as discussed in more detail below. In an exemplary embodiment, the retention heads 162 may be formed from metal, such as steel. However, other suitable materials may also be possible.

To facilitate a coupling between the blade 20 and the rotor hub 18, the cross pins 160 may be inserted through respective eyes 56 of the connecting elements 26. The cross pins 160 extend beyond the thickness or height of the eye 56 so that a portion of the cross pin 160 extends above and/or below the material that forms the root end 22 of the blade 20. This corresponds, for example, to the cross pins 160 extending beyond the exterior and interior surface of the root end 22 of the blade 20. The lips 178 in second end surface 176 are positioned on the cross pin 124 so as to be exposed above and below the material that forms the root end 22 of the blade 20. With the cross pins 124 so positioned relative to the eyes 56 of the connecting elements 26, retention heads 162 may be positioned so that the first end surface 190 of the retention heads 162 abut the second end surface 176 of two adjacent cross pins 160. Thus, each retention head 162 is supported by two cross pins 160. More particularly, the contact surface 198 of leg 196 engages with one cross pin 160, the contact surfaces 206 of legs 202, 204 engage with an adjacent cross pin 160, and the through bore 194 in the main body 180 is centrally located between the two adjacent retention heads 160. The retention heads 162 may be placed circumferentially in the interlocking configuration described above. Additionally, the lips 178 engage the retention heads 162 to facilitate placement.

Fasteners, such as stud bolts 210 having threaded ends 212 may be inserted through the bores 194 and secured to the retention heads 162 via nuts 214. The other end of the stud bolt 210 extends beyond the end face 28 of the root end 22 of the blade 20 and may be received within bores 216 in the hub member 120, which in one embodiment may be a flange extending from a ring of the blade bearing. In one embodiment, the bores 216 may be threaded so as to secure with the threaded end 218 of the stud bolt. Alternatively, suitable nuts (not shown) may be threadably engaged with the threaded end 218 of the stud bolt 210. This process may be repeated along the circumference of the root end 22 of the blade 20 on both the exterior and/or interior surfaces, for example. This arrangement secures the end face 28 at the root end 22 of the blade 20 tightly up against the hub member 120 to thereby secure the blade 20 to the rotor hub 18.

Similar to the previous embodiment, a beneficial aspect of the arrangement described above is that the structural elements through which forces are transferred between the blade 20 and hub 18 and which extend across the joint interface (e.g., the stud bolts) do not extend through or into the material that forms the root end 22 of the blade 20. In the arrangement above, those structural elements are both above and/or below (e.g., exterior and/or interior to) the material that forms the root end 22 of the blade 20. No axial holes have to be drilled or otherwise formed in the material that makes up the root end 22 of the blade 20. This results in less material being removed from the root region thereby providing a stronger connection joint 24a. Furthermore, the forces that are transferred between the blade 20 and the hub 18 occur through the contact area between the cross pins 160 and the eyes 56 of the connecting elements 26. As noted above, the fibers that form the head end 32 of the connecting elements 26 are not cut or otherwise broken in this region and thus this design constitutes an extremely strong connection interface. Accordingly, it is believed that the connection joint 24a as described above provides a stronger connection joint for a fixed size of root end, and thus is capable of accommodating increased loading on the blades 20 without a corresponding increase in interface size. It is further believed that the design is also more cost effective for the strength provided by the joint.

Figure 19A:
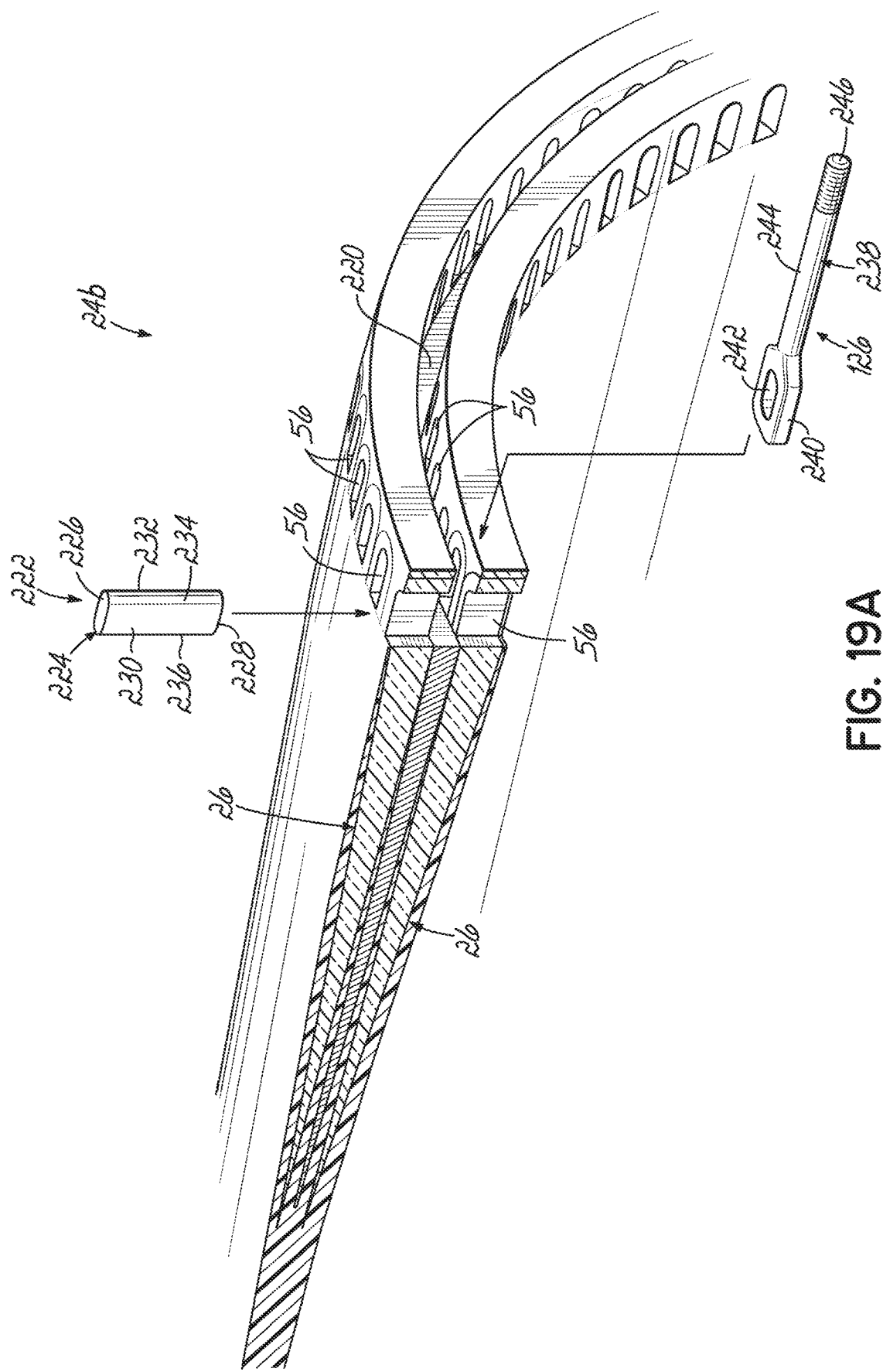
FIGS. 19A and 19B is an exterior view of a connection joint in accordance with another embodiment of the invention.
Figure 19B:
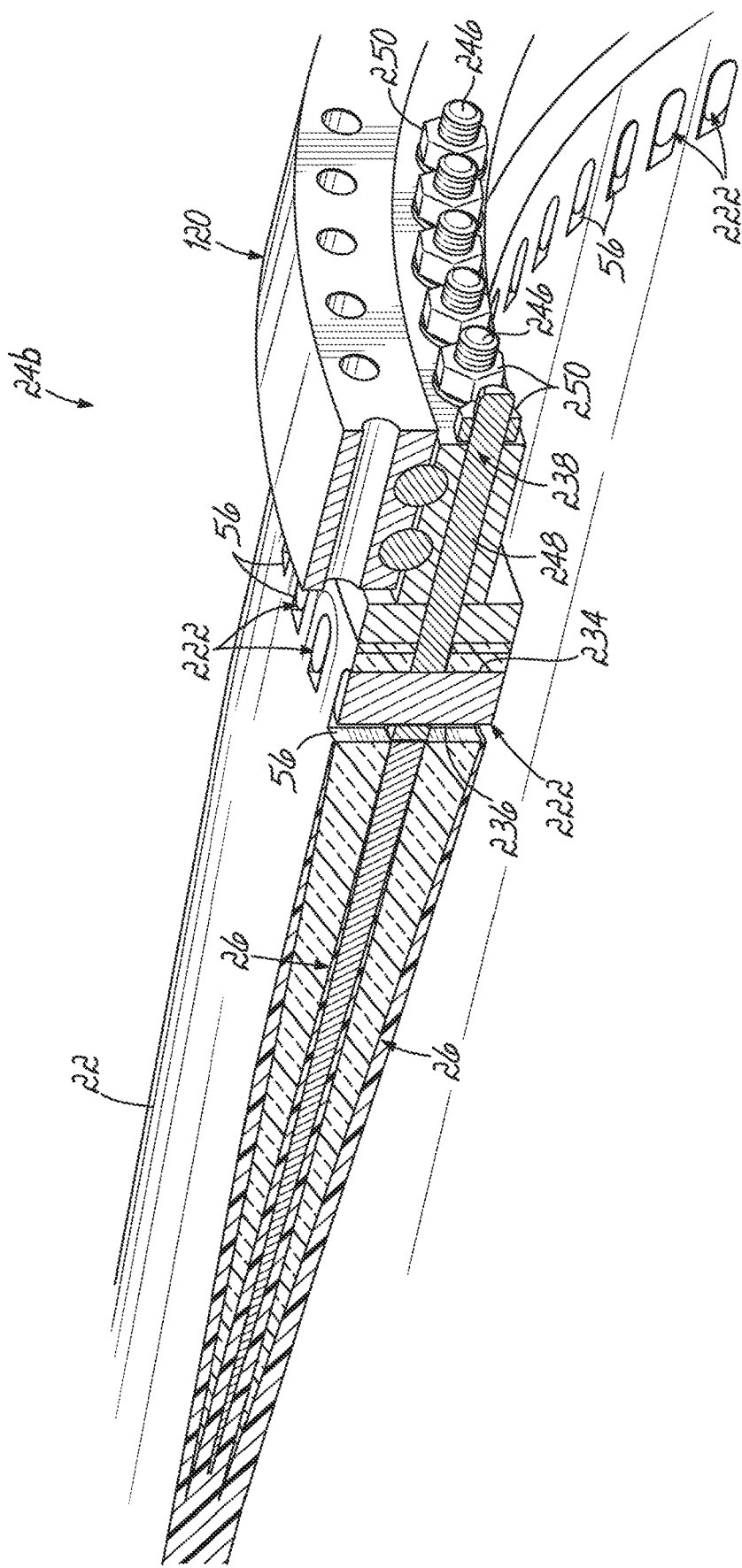
Figure 20:
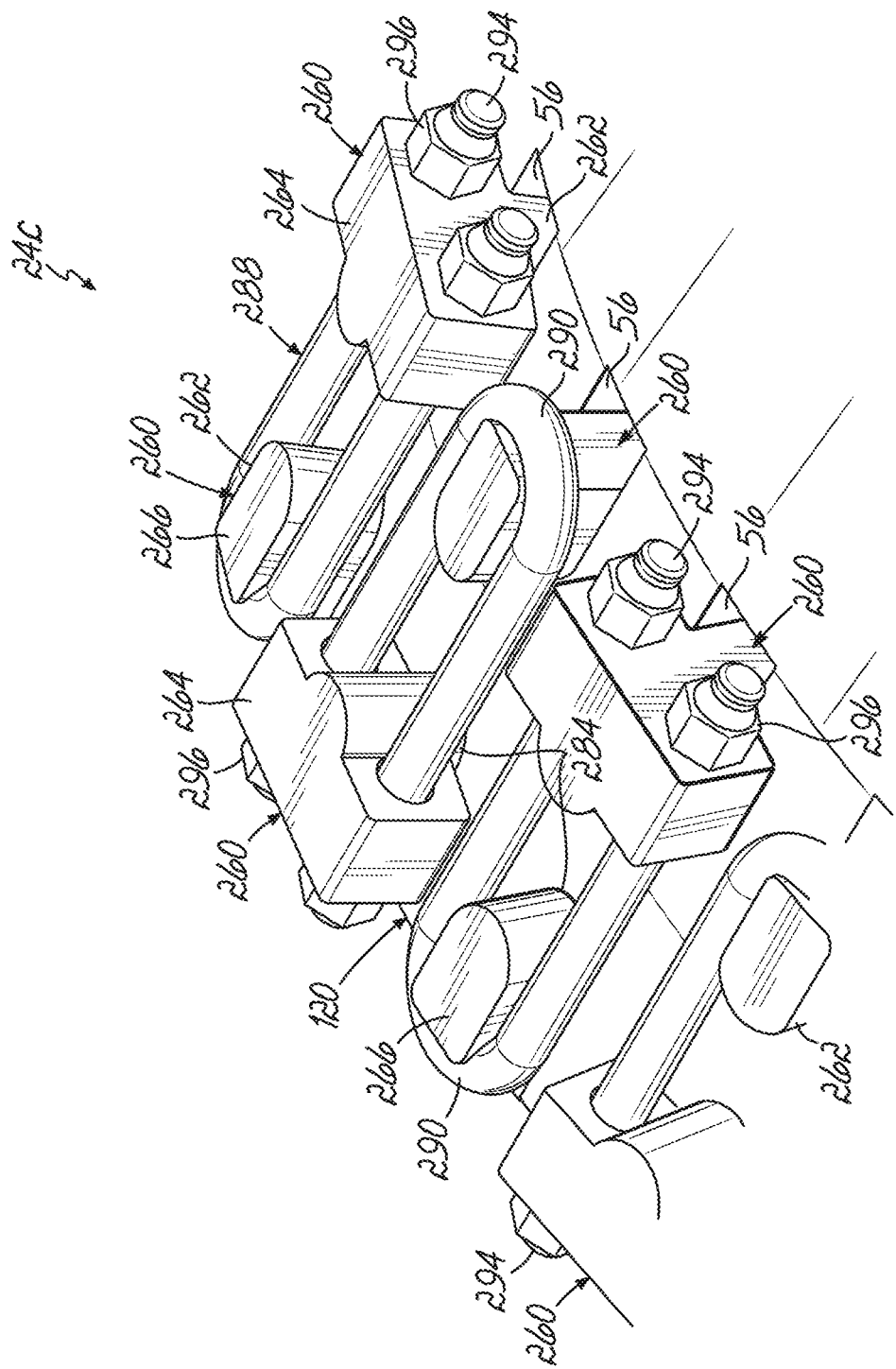
FIG. 20 is an exterior view of a connection joint in accordance with another embodiment of the invention.
Figure 21:
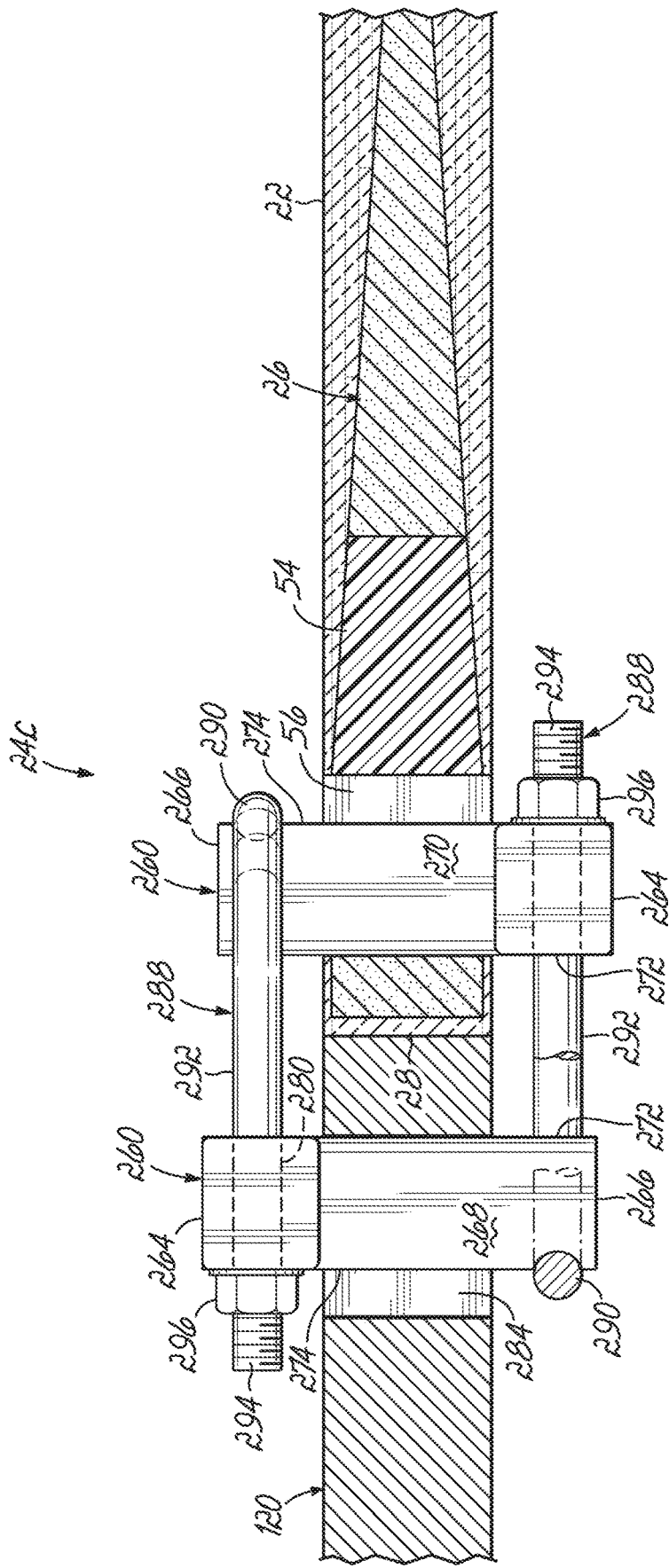
FIG. 21 is a cross-sectional view of the connection joint shown in FIG. 20.
Figure 23:
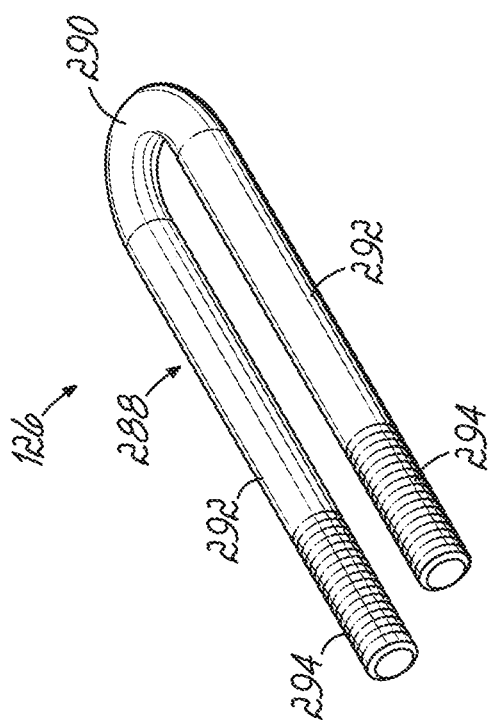
Figure 22:
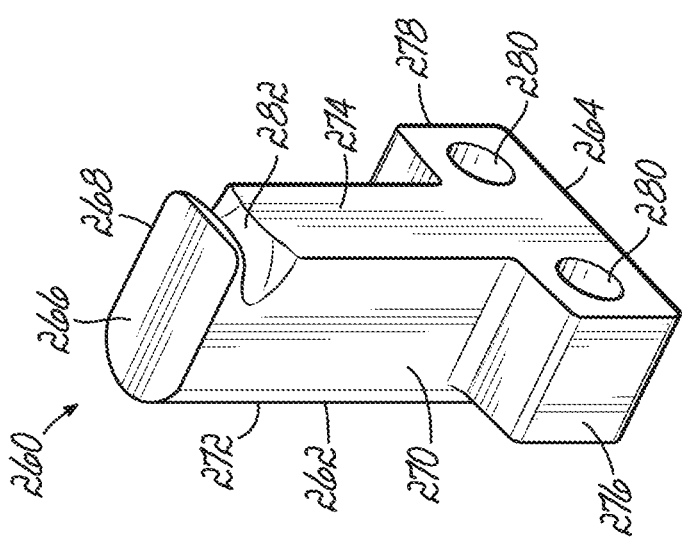
FIG. 22 illustrates a fastener for the connection joint shown in FIG. 20.

In another exemplary embodiment illustrated in FIGS. 19A and 19B, the connection joint 24b may be slightly different than that described above. More particularly, in the prior embodiments only a single connecting element 26 was used across the thickness or height of the material that made up the root end 22 of the blade 20. As illustrated in the present embodiment, however, there may be more than one connecting element across the thickness of the material that makes up the composite article. In this regard, for articles that require significant thickness, during the fiber lay-up process in the molding apparatus, two (or possibly more) connecting elements 26 may be integrated into the root end 22 of the blade 20. However, during that lay up process, no fiber material may be positioned between the head ends 32 of the stacked connecting elements 26, such that there is a gap 220 between adjacent connecting elements 26 (in a thickness direction). This molding process results in a root end 22 as illustrated in FIG. 19A.

In any event, with such an arrangement, the connection joint 24b further includes a plurality of slide members or cross pins 222 configured to be engaged with respective eyes 56 of the connecting elements 26, and a plurality of fasteners 126 for coupling the cross pins to the hub element 120. The cross pins 222 have a cross-sectional shape that generally matches the shape of the eyes 56 that extend through the connecting elements 26. By way of example, in this embodiment the cross pins 222 include an elongate body 224 having generally planar top and bottom surfaces 226, 228, first and second generally planar side surfaces 230, 232, a generally arcuate first end surface 234, and a generally arcuate second end surface 236. The size of the cross pins 124 is such as to fit within the eyes 56 of the connection elements 26. The first end surface 234 may be curved to generally correspond to the curvature of the head end of the eye 56. The second end surface 236 may in this embodiment be generally arcuate and correspond to a generally arcuate surface of the insert 54. In an exemplary embodiment, the cross pins 222 may be formed from metal, such as steel. However, other suitable materials may also be possible.

The fasteners in this embodiment include a plurality of I-bolts 238 having a head 240 with a bore 242 therethrough and an elongated shaft 244 extending therefrom and having a threaded end 246. To facilitate a coupling between the blade 20 and the rotor hub 18, the heads 240 of the I-bolts 238 may be inserted into the gap 220 between the radially stacked connecting elements 26 such that the eyes 56 of the connecting elements 26 are generally aligned with the bores 242 of the I-bolts 238. The cross pins 222 may then be inserted through the aligned eyes 56 and bores 242 of the connecting elements 26 and I-bolts 238. The threaded end 246 of the I-bolts 238 extends beyond the end face 28 of the root end 22 of the blade 20 and may be received within bores 248 in the hub member 120, which in one embodiment may be a flange extending from a ring of the blade bearing. In one embodiment, the bores 248 may be threaded so as to secure with the threaded end 246 of the I-bolts 238. Alternatively, suitable nuts 250 may be threadably engaged with the threaded end 246 of the I-bolts 238. This process may be repeated along the circumference of the root end 22 of the blade 20. This arrangement secures the end face 28 at the root end 22 of the blade 20 tightly up against the hub member 120 to thereby secure the blade 20 to the rotor hub 18.

Another exemplary embodiment of a connection joint 24c in accordance with aspects of the present invention are illustrated in FIGS. 20-23. Similar to previous embodiments, the connection joint 24c further includes a plurality of T-shaped slide members or cross pins 260 configured to be engaged with the eyes 56 of the connecting elements 26 and a plurality of fasteners 126 for coupling the cross pins 260 to the hub element 120. The cross pins 260 have a cross-sectional shape that generally matches the shape of the eyes 56 of the connecting elements 26. In this embodiment, the cross pins 260 include an elongate body 262 having generally planar top and bottom surfaces 264, 266, first and second generally planar side surfaces 268, 270, a generally arcuate first end surface 272, and a second end surface 274. The size of the cross pin 260 is such as to fit within the eyes 56 of the connection elements 26. The first end surface 272 may be curved to generally correspond to the curvature of the head end of the eye 56. The second end surface 274 may be generally planar and correspond to a generally planar surface of the insert 54. Alternatively, however, the second end surface 274 may also be generally arcuate having, for example, a radius of curvature substantially equal to the radius of curvature of the first end surface 272. The first and second side surfaces 268, 270 include generally rectangular bosses 276, 278 extending therefrom and adjacent the top surface 264 (e.g., so as to be flush or planar therewith) so that the cross pin 260 is generally T-shaped. Each of the bosses 276, 278 include a through bore 280 extending between first and second end surfaces of the bosses. Additionally, the second end surface 274 may further include a groove 282 adjacent the bottom surface 266 that extends across the end surface 274 in a direction generally transverse to a longitudinal direction of the cross pin 260. The groove 282 may be generally arcuate in cross section. In an exemplary embodiment, the cross pins 260 may be formed from metal, such as steel. However, other suitable materials may also be possible.

Unlike previous embodiments, in this embodiment the hub member 120 may include bores 284 which are similar to the eyes 56 of the connecting elements 26. In this way, the bores 284 of the hub element 120 may be configured to receive cross pins 260 similar to those received in the eyes 56 of the connecting elements 26 in the root end 22 of the blade 20. To facilitate a coupling between the blade 20 and rotor hub 18, cross pins 260 may be inserted through the eyes 56 of the connecting elements 26 in the root end 22 of the blade 20, either from exterior to interior or interior to exterior. The bosses 276, 278 extend outboard of the eyes 56 such that that portion of the cross pin 260 (e.g., the cross portion of the T) cannot pass through the eyes 56 and therefore engage an exterior or interior side wall surface of the root end 22 of the blade 20. In an exemplary embodiment, adjacent cross pins 260 in a circumferential direction of the root end 22 alternate in the orientation of the cross pins 260. Thus, the bosses 276, 278 of a cross pin 260 may engage the exterior surface of the root end 22 while the bosses of an adjacent cross pin 260 engage the interior surface of the root end 22, and vice versa. This alternating pattern is repeated along the circumference of the root end 22 of the blade 20.

In a similar manner, cross pins 260 may be inserted through the bores 284 in the hub member 120, either from a first side of the hub member 120 to a second side of the hub member 120, or from a second side to a first side of the hub member 120. The bosses 276, 278 extend outboard of the bores 284 such that that portion of the cross pins 260 cannot pass through the bore 284 and therefore engage a first or second surface of the hub member 120. In an exemplary embodiment, adjacent cross pins 260 in a circumferential direction of the hub member 120 alternate in the orientation of the cross pin 260. Thus, the bosses 276, 278 of a cross pin 260 may engage the first side surface of the hub member 120 while the bosses of an adjacent cross pin 260 engage the second side surface of the hub member 120, and vice versa. This alternating pattern is repeated along the circumference of the hub member 120. However, the alternating pattern in the root end 22 of the blade 20 and the alternating pattern in the hub member 120 are opposite to each other such that axially aligned cross pins 260 across the joint interface 286 have opposite orientations.

In this embodiment, the fasteners 126 include U-bolts 288 having a central portion 290 and opposed legs 292 with threaded ends 294 to secure the root end 22 of the blade 20 to the hub member 120. In this regard, and with regard to a pair of axially aligned cross pins 260 and on a first side (e.g., or the exterior of first end and hub member), the threaded ends 294 of a U-bolt 288 may be inserted through the bores 284 in the bosses 276, 278 of one of the cross pins 260 and the central portion 290 of the U-bolt 288 may be seated within the groove 282 in the other cross pin 260 axially aligned across the joint interface. Suitable nuts 296 may be threadably engaged with the threaded ends 294 of the U-shaped bolts 288 to secure the root end 22 of the blade 20 to the hub member 120. The same process may be used on the second side of the connection joint 24c (e.g., or the interior of the root end and hub member). Notably, however, the orientation of the U-bolt on the second side is opposite to that on the first side of the connection joint 24c. In other words, if a cross pin includes the threaded legs 292 and nuts 296 of a U-bolt on a first side of a connection joint (e.g., exterior side of root end 22 or first side of hub member 120), then the same cross pin includes the central portion 290 of a U-bolt on the other side of the connection joint (e.g., interior side of root end 22 or second side of hub member 120). Thus for an aligned pair of cross pins 260 there is a symmetry that more evenly balances the forces. It is believed that the connection joint 24c not only provides a stronger joint between the blade 20 and the rotor hub 18, but the alternating arrangement provided by this embodiment also provides a more uniform distribution of the forces across the joint interface.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

What is claimed is:
1. A wind turbine rotor blade, comprising:
an elongate body having a root end and a tip end, the root end of the rotor blade configured to be coupled to a rotor hub of a wind turbine and including an end face and a side wall extending away from the end face; and
a connection joint at the root end of the rotor blade for connecting the rotor blade to the rotor hub, the connection joint comprising a plurality of connecting elements integrated into the root end of the rotor blade, each connecting element including an eye that defines a bore through the side wall of the root end of the rotor blade and which is spaced from the end face, wherein each of the plurality of connecting elements includes a folded roving of fibers, wherein each eye of the plurality of connecting elements is defined at least in part by the fold in the roving of fibers.

2. The wind turbine rotor blade according to claim 1, wherein the folded roving of fibers defines a through hole, each connecting element further comprising an insert positioned in the through hole such that a portion of the through hole and a portion of the insert forms a boundary of the eye of the connecting elements.

3. The wind turbine rotor blade according to claim 1, wherein the roving of fibers includes stacked plies of fiber material.

4. The wind turbine rotor blade according to claim 3, wherein substantially all of the stacked plies of fiber material include unidirectional fiber plies.

5. The wind turbine rotor blade according to claim 1, wherein the fibers include glass fibers, carbon fibers, or combinations thereof.

6. The wind turbine rotor blade according to claim 1, wherein at least a portion of the eyes of the plurality of connecting elements is formed by longitudinal side walls of the roving of fibers such that there are no fiber endings at a boundary of the eyes along the portion formed by the roving of fibers.

7. The wind turbine rotor blade according to claim 1, wherein each of the plurality of connecting elements is made entirely from a composite material.

8. The wind turbine rotor blade according to claim 1, wherein each of the plurality of connecting elements is wedge shaped.

9. The wind turbine rotor blade according to claim 1, wherein the root end is a molded article and the plurality of connecting elements is integrated into the root end during molding of the root end.

10. The wind turbine rotor blade according to claim 1, further comprising a plurality of cross pins configured to be inserted through respective eyes of the plurality of connecting elements which form the bores in the side wall of the root end, wherein when the cross pins are received in the eyes, an exposed portion of the cross pins is configured to extend away from at least one surface of the side wall of the root end of the rotor blade.

11. The wind turbine rotor blade according to claim 10, wherein when the cross pins are received in the eyes, an exposed portion of the cross pins is configured to extend away from an outer surface of the side wall and an inner surface of the side wall of the root end.

12. The wind turbine rotor blade according to claim 10, wherein the cross pins include one or more grooves configured to receive a fastener.

13. The wind turbine rotor blade according to claim 10, wherein the cross pins include a pair of opposed bosses to provide a T-shaped cross pin, wherein each of the bosses includes a through hole configured to receive a fastener.

14. The wind turbine rotor blade according to claim 10, wherein the cross pins are slidably insertable into respective eyes of the plurality of connecting elements.

15. The wind turbine rotor blade according to claim 10, further comprising a plurality of retention heads, wherein each retention head includes a through hole for receiving a fastener, and wherein each retention head is configured to abut two adjacent cross pins.

16. The wind turbine rotor blade according to claim 10, further comprising a plurality of fasteners for securing the root end of the rotor blade to a hub support of the rotor hub.

17. The wind turbine rotor blade according to claim 16, wherein the fasteners are configured to engage with an exposed portion of the cross pins when the cross pins are received through respective eyes of the plurality of connecting elements.

18. The wind turbine rotor blade according to claim 16, wherein the plurality of fasteners include a plurality of U-bolts, stud bolts, or I-bolts.

19. A wind turbine, comprising:
    a tower;
    a nacelle positioned atop of the tower;
    a rotor coupled to the nacelle and including a rotor hub having a hub support and at least one rotor blade according to claim 1;
    a plurality of cross pins received through respective eyes of the plurality of connecting elements which form the bores in the side wall of the root end, wherein the cross pins include an exposed portion that extends away from at least one surface of the side wall of the root end of the blade; and
    a plurality of fasteners, each engaging the exposed portion of the cross pins and coupled to the hub support for securing the root end of the rotor blade to the rotor hub.

20. The wind turbine according to claim 19, wherein the exposed portion of the cross pins extends away from an outer surface and an inner surface of the side wall of the root end and a fastener engages the exposed portion extending from both the inner and outer surfaces of the side wall of the root end.

21. The wind turbine according to claim 19, wherein each of the plurality of fasteners extends across a connection interface between the rotor blade and the rotor hub adjacent to the at least one surface of the side wall of the root end of the rotor blade.

22. A method of making the plurality of connecting elements of the wind turbine rotor blade according to claim 1, comprising:
    providing a mandrel having a top surface, a bottom end, and a pair of side surfaces;
    arranging finite-length fiber rovings over the top surface of the mandrel to form the fold in each fiber roving and bringing ends of the fiber rovings together to define a through hole in the fiber rovings;
    infusing resin into the fiber rovings;
    at least partially curing the fiber rovings and resin to form a composite article;
    removing the mandrel from the composite article; and
    cutting the composite article to form the plurality of connecting elements.

23. The method according to claim 22, further comprising removably coupling an insert to the bottom end of the mandrel such that the fiber rovings drape down over the insert and the insert is positioned in the through hole in the fiber rovings, wherein a portion of the through hole and a portion of the insert define the eye in each of the plurality of connecting elements.

24. The method according to claim 23, wherein arranging finite-length fiber rovings further comprises stacking a plurality of finite-length fiber plies over the mandrel.

25. The method according to claim 22, wherein the top surface of the mandrel is arcuate to provide a through hole in the composite article having an arcuate portion.

26. A method of making a wind turbine rotor blade having a root end, comprising:
    providing a molding apparatus having a molding surface;
    providing a plurality of connecting elements made according to the method of claim 22;

laying a first assembly of fiber plies in the molding apparatus;

inserting the plurality of connecting elements in the molding apparatus;

laying a second assembly of fiber plies in the molding apparatus, wherein the plurality of connecting elements are positioned between the first and second assembly of fiber plies;

infusing resin into the first and second assemblies of fiber plies; and curing the fiber plies and resin to form the root end of the rotor blade, the root end having an end face and a side wall extending therefrom, wherein the plurality of connecting elements is arranged in the molding apparatus such that at least a portion of the through hole in each of the plurality of connecting elements defines the bore through the side wall of the root end which is spaced from the end face.

27. The method according to claim 25, further comprising:

providing a plurality of anchors in the molding apparatus, the anchors coupled to the molding surface and extending therefrom; and supporting each of the plurality of connecting elements on a respective anchor such that the anchors extend through the through holes in the connecting elements.

28. The method according to claim 27, wherein the anchors are removably coupled to the molding apparatus and the method further comprises:

removing the anchors from the molding apparatus; and de-molding the root end of the rotor blade from the molding apparatus.

\* \* \* \* \*